United States Patent
Matsumoto et al.

(10) Patent No.: US 6,792,345 B2
(45) Date of Patent: Sep. 14, 2004

(54) LANE-KEEP CONTROL SYSTEM FOR VEHICLE

(75) Inventors: Shinji Matsumoto, Yokohama (JP); Satoshi Tange, Kanagawa (JP); Hiroyuki Yoshizawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/300,775

(22) Filed: Nov. 21, 2002

(65) Prior Publication Data

US 2003/0120414 A1 Jun. 26, 2003

(30) Foreign Application Priority Data

Dec. 26, 2001 (JP) ........................................ 2001-395209

(51) Int. Cl.[7] .......................... G06F 7/70; B60K 31/08; B60R 21/00
(52) U.S. Cl. .......................... 701/96; 701/210; 303/125
(58) Field of Search .......................... 701/70, 210, 211, 701/213, 300, 301, 96, 79, 200, 93, 41; 303/125, 132, 167; 342/70, 71; 340/435, 903, 436, 437

(56) References Cited

U.S. PATENT DOCUMENTS

| | | | | |
|---|---|---|---|---|
| 5,529,139 A | * | 6/1996 | Kurahashi et al. | 180/169 |
| 6,269,308 B1 | * | 7/2001 | Kodada et al. | 701/301 |
| 6,282,478 B1 | * | 8/2001 | Akita | 701/70 |
| 6,308,123 B1 | * | 10/2001 | Ikegaya et al. | 701/41 |
| 6,349,998 B1 | * | 2/2002 | Franke et al. | 303/148 |
| 6,370,474 B1 | * | 4/2002 | Hiwatashi et al. | 701/300 |
| 6,466,863 B2 | * | 10/2002 | Shirai et al. | 701/200 |
| 6,496,771 B2 | * | 12/2002 | Hattori et al. | 701/96 |

FOREIGN PATENT DOCUMENTS

JP          8-263791 A       10/1996

\* cited by examiner

Primary Examiner—Tan Q. Nguyen
Assistant Examiner—Dalena Tran
(74) Attorney, Agent, or Firm—Foley & Lardner LLP

(57) ABSTRACT

A lane-keep control system is installed in a host vehicle equipped with an inter-vehicle distance control system. The lane-keep control system is arranged to decrease a threshold to be compared with the vehicle traveling condition for determining the tendency of the lane deviation when the inter-vehicle distance is being executed, so that the deviation avoidance control during execution of the inter-vehicle distance control is started earlier than the deviation avoidance control during inexecution of the inter-vehicle distance is started.

15 Claims, 10 Drawing Sheets

LANE-KEEP CONTROL SYSTEM FOR VEHICLE

BACKGROUND OF THE INVENTION

The present invention relates to a lane-keep control system which controls a host vehicle so as to avoid the host vehicle from deviating from a traveling lane, and more particularly to a lane-keep control system which is preferably adapted to a vehicle equipped with an inter-vehicle distance control (vehicle following control) system for controlling an inter-vehicle distance between the host vehicle and a preceding vehicle ahead of the host vehicle.

Japanese Patent Provisional Publication No. 8-263791 discloses a vehicle control system which has a lane-keep control function and a vehicle following control function.

SUMMARY OF THE INVENTION

However, this proposed control system is merely arranged to stop the lane-keep control when the vehicle following control is being executed and to start the lane-keep control when there is no preceding vehicle ahead of the host vehicle. Therefore, when the host vehicle travels a well-trafficked road, the vehicle equipped with this control system does not execute the lane-keep control almost always.

It is therefore an object of the present invention to provide an improved lane-keep control system which positively executes a lane-keep control during a vehicle following control, in cases except for a case that the operation of the lane-keep control during the vehicle following control applies a strange feeling to a driver.

An aspect of the present invention resides in a lane-keep control system which is for a host vehicle and comprises a control unit. The control unit is configured to detect an inter-vehicle distance between the host vehicle and an object ahead of the host vehicle, to execute an inter-vehicle distance control for bringing the inter-vehicle distance closer to a target inter-vehicle distance, to detect a traveling condition of the host vehicle, to determine whether there is a tendency of a lane deviation indicative that the host vehicle is deviating from a traveling lane, according to the traveling condition, to execute a deviation avoidance control for controlling the host vehicle toward a deviation-avoiding direction of avoiding the lane deviation according to the traveling condition when there is the tendency of the lane deviation, to determine that the inter-vehicle distance control is being executed, and to advance a start timing of the deviation avoidance control when the inter-vehicle distance control is being executed.

Another aspect of the present invention resides in a lane-keep control system for a host vehicle and comprises a control unit. The control unit is configured to detect an inter-vehicle distance between the host vehicle and an object ahead of the host vehicle, to execute an inter-vehicle distance control for bringing the inter-vehicle distance closer to a target inter-vehicle distance, to detect a traveling condition of the host vehicle, to determine whether there is a tendency of a lane deviation indicative that the host vehicle is deviating from a traveling lane, according to the traveling condition, to execute a deviation avoidance control for controlling the host vehicle toward a deviation-avoiding direction of avoiding the lane deviation according to the traveling condition when there is the tendency of the lane deviation, and to limit execution of the deviation avoidance control according to a determination value corresponding to the inter-vehicle distance.

A further another aspect of the present invention resides in a method of a traveling condition a host vehicle. The method comprises an operation of detecting an inter-vehicle distance between the host vehicle and an object ahead of the host vehicle, an operation of executing an inter-vehicle distance control for bringing the inter-vehicle distance closer to a target inter-vehicle distance, an operation of detecting a traveling condition of the host vehicle, an operation of determining whether there is a tendency of a lane deviation indicative that the host vehicle is deviating from a traveling lane, according to the traveling condition, an operation of executing a deviation avoidance control for controlling the host vehicle toward a deviation-avoiding direction of avoiding the lane deviation according to the traveling condition when there is the tendency of the lane deviation, an operation of determining that the inter-vehicle distance control is being executed, and an operation of advancing a start timing of the deviation avoidance control when the inter-vehicle distance control is being executed.

The other objects and features of this invention will become understood from the following description with reference to the accompanying drawings.

DETAILED DESCRIPTION OF THE INVENTION

With reference to drawings, there will be discussed embodiments of a lane-keep control system according to the present invention hereinafter.

Referring to FIGS. 1 through 7, there is shown a first embodiment of the lane-keep control system for a host vehicle according to the present invention.

Figure 1:
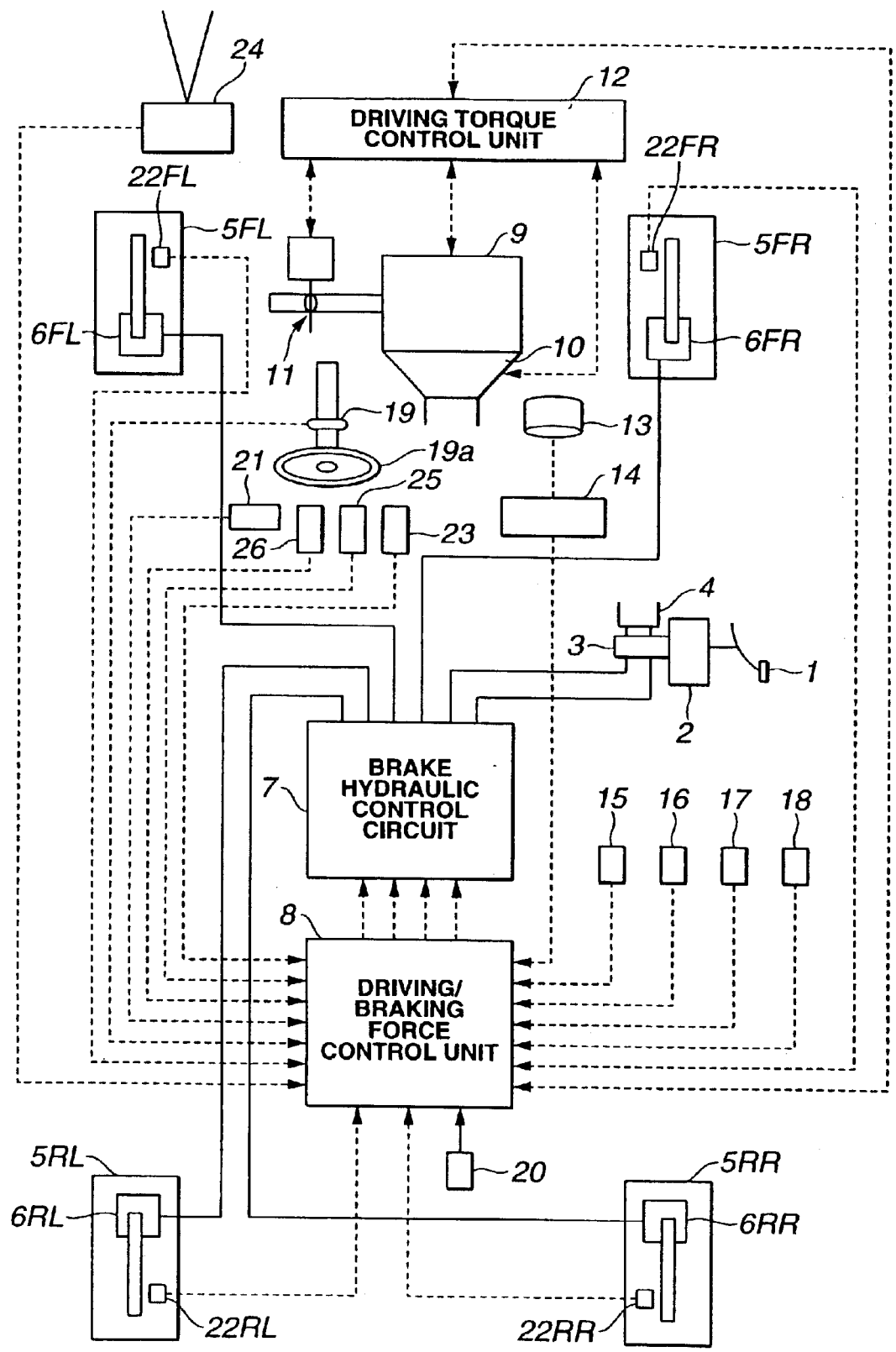
FIG. 1 is a schematic view showing a vehicle equipped with a lane-keep control system according to a first embodiment of the present invention.

As shown in FIG. 1, the host vehicle of a rear-wheel drive type is equipped with an automatic transmission and a conventional differential gear. The host vehicle comprises a brake system which is capable of independently controlling a braking force of each of front-left, front-right, rear-left and rear-right wheels 5FL, 5FR, 5RL and 5RR. The brake system comprises a brake pedal 1, a booster 2, a master cylinder 3 and a reservoir 4. Normally, each of wheel cylinders 6FL, 6FR, 6RL and 6RR of the respective wheels 5FL, 5FR, 5RL and 5RR receives brake hydraulic pressure pressurized by master cylinder 3 according to a depression degree of brake pedal 1 depressed by a driver. Further, a brake hydraulic control circuit 7 is provided between master cylinder 3 and each of wheel cylinders 6FL, 6FR, 6RL, and 6RR so as to be capable of independently controlling the hydraulic pressure of each of wheel cylinders 6FL, 6FR, 6RL and 6RR.

Brake hydraulic control circuit 7 is common with a brake hydraulic pressure control circuit employed in an antiskid control system and/or a traction control system. In this embodiment, the brake system is arranged so as to independently increase and decrease brake hydraulic pressure of each of wheel cylinders 6FL, 6FR, 6RL and 6RR. Brake hydraulic control circuit 7 controls the brake hydraulic pressure of each of wheel cylinders 6FL, 6FR, 6RL and 6RR according to a command brake hydraulic pressure outputted from driving/braking force control unit 8.

The host vehicle is further equipped with a driving torque control unit 12 which controls a driving torque applied to rear wheels 5RL and 5RR by controlling an operating condition of an internal combustion engine 9, a selected transmission ratio of an automatic transmission 10 and a throttle opening of a throttle valve 11. The control of the operating condition of engine 9 is executed by controlling a fuel injection quantity and ignition timing. Further, the control of the fuel injection quantity and the ignition timing may be simultaneously executed with the throttle opening control to control the operating condition of engine 9. Driving torque control unit 12 is capable of independently controlling the driving torque of rear wheels 5RL and 5RR acting as driving wheels. Further, when driving torque control unit 12 receives a command driving torque from driving/braking force control unit 8, driving torque control unit 12 controls the driving torque with reference to the command driving torque.

The host vehicle is further equipped with a CCD camera 13 and a camera controller 14 which function as an external sensing unit for detecting a position of the host vehicle relative to a traveling lane, in order to determine whether the host vehicle is deviating from the traveling lane, in other words, whether there is a tendency of a lane deviation of the host vehicle from a traveling lane. Camera controller 14 detects lane markers of the traveling lane from an image picture indicative of an area ahead of the host vehicle, which picture is taken by CCD camera 13. On the basis of the obtained lane makers ahead of the host vehicle, camera controller 14 defines a traveling lane and calculates a yaw angle $\phi$ of the host vehicle relative to the traveling lane, a lateral displacement X of the host vehicle relative to a center of the traveling lane, a curvature $\beta$ of the traveling lane, a width L of the traveling lane and the like.

When the detection of the lane markers is not clearly executed due to unclearness of the lane markers caused by wearing or a weather factor such as snowing, the parameters indicative of yaw angle $\phi$, lateral displacement X, curvature $\beta$, and width L are set at zero. Further, when the detecting condition of the lane markers is turned from a detectable condition to an undetectable condition due to some obstacles for a short time, driving/braking force control unit 8 employs the previous data which is, in turn, stored in a storage section of driving/braking force control unit 8.

Furthermore, the host vehicle is equipped with an acceleration sensor 15 for detecting a longitudinal acceleration Xg and a lateral acceleration Yg of the host vehicle, a yaw rate sensor 16 for detecting a yaw rate $\phi'$ of the host vehicle, a master cylinder pressure sensor 17 for detecting a master cylinder pressure Pm indicative of an output pressure of master cylinder 3, an accelerator opening sensor 18 for detecting an accelerator opening Acc indicative of a depression degree of an accelerator pedal, a steer angle sensor 19 for detecting a steer angle $\delta$ of a steering wheel 19a, a directional-signal switch 20 for detecting a turn-direction indicating operation of the driver through turn-signal lamps, an alarm monitor 21 with a speaker for generating an alarming sound of alarming a lane-deviation of the host-vehicle to a driver, wheel speed sensors 22FL, 22FR, 22RL and 22RR for respectively detecting wheel speeds $Vw_{FL}$, $Vw_{FL}$, $Vw_{FL}$ and $Vw_{FL}$ of wheels 5FL, 5FR, 5RL and 5RR, and a deviation-avoidance-control starting switch 23 disposed in the vicinity of a driver's seat.

Driving/braking force control unit 8 receives detection signals of the above-discussed sensors 15 through 20 installed in the host vehicle. Further, driving/braking force control unit 8 receives signals indicative of yaw angle $\phi$, lateral displacement X, curvature $\beta$ and width L from camera controller 14, and driving torque Tw controlled by driving torque control unit 12.

When the traveling condition indicative data treated by driving/braking force control unit 8 includes a directionality of leftward or rightward, the data indicative of leftward is represented by a positive value. Accordingly, when the host vehicle turns left, yaw rate $\phi'$, lateral acceleration Yg, steer angle $\delta$ and yaw angle $\phi$ respectively take positive values. Further, when the host vehicle deviates from a center of the traveling lane to a leftward position, lateral displacement X takes a positive value. On the other hand, when the host vehicle turns right, yaw rate $\phi'$, lateral acceleration Yg, steer angle $\delta$ and yaw angle $\phi$ respectively take negative values. Further, when the host vehicle deviates from a center of the traveling lane to a rightward position, lateral displacement X takes a negative value.

Further, the host vehicle is equipped with a distance sensor 24 which is constructed by a millimeter-wave radar sensor or the like and is disposed at a front portion of the host vehicle. Distance sensor 24 detects an inter-vehicle distance $L_x$ between the host vehicle and a preceding vehicle ahead of the host vehicle, and outputs a signal indicative of inter-vehicle distance $L_x$ to driving/braking force control unit 8. Furthermore, there are disposed an inter-vehicle distance control starting switch 25 for manually starting the inter-vehicle distance control and a target inter-vehicle distance selecting switch 26 for selecting one of a short target distance $L_{XS*}$, a medium target distance $L_{XM*}$, and a long target distance $L_{XL*}$ according to the driver's like. Driving/braking force control unit 8 receives a switch signal $SW_L$ of inter-vehicle distance control starting switch 25 and the selected target distance $L_{Xj*}$ (j=S, M, L).

Subsequently, there will be discussed a lane-keep control processing executed by driving/braking force control unit 8, with reference to a flowchart of FIG. 2. This lane-keep control processing is a timer interruption routine executed at 10 milliseconds sampling-time intervals.

At step S1, control unit 8 reads data outputted from various sensors, various controllers and control units shown in FIG. 1. Specifically, the data includes longitudinal acceleration Xg, lateral acceleration Yg, yaw rate φ', each wheel speed $Vw_i$, accelerator opening Acc, master-cylinder pressure $P_m$, steer angle δ, turn-signal lamp switch signal WS, driving torque Tw outputted from driving torque control unit 12, yaw angle φ, lateral displacement X, curvature β, lane width $L_Y$, inter-vehicle distance $L_X$, switch signal $SW_D$ of deviation-avoidance control starting switch 23, switch signal $SW_L$ of inter-vehicle distance control starting switch 25 and selected target distance $L_{Xj}*$ selected by target inter-vehicle distance control selecting switch 26.

At step S2, control unit 8 determines whether switch signal $SW_L$ of inter-vehicle distance control starting switch 25 is set in ON state or not. When the determination at step S2 is affirmative, that is, when switch signal $SW_L$ is set in ON state, the routine proceeds to step S3 wherein control unit 8 sets a distance control operation flag $F_{AC}$ is set at 1 ($F_{AC}=1$). Thereafter, the routine proceeds to step S5. When the determination at step S2 is negative, that is, when switch signal $SW_L$ is set in OFF state, the routine proceeds to step S4 wherein control unit 8 sets distance-control operation flag $F_{AC}$ is set at 0 ($F_{AC}=0$). Thereafter, the routine proceeds to step S5.

At step S5, control unit 8 determines whether switch signal $SW_D$ of deviation-avoidance-control starting switch 23 is set in ON state or not. When the determination at step S5 is affirmative, that is, when switch signal $SW_D$ is set in ON state, the routine proceeds to step S6 wherein control unit 8 determines whether or not distance control operation flag $F_{AC}$ is changed from 1 to 0. When the determination at step S6 is negative, that is, when distance control operation flag $F_{AC}$ maintains 1 or 0 or when distance control operation flag $F_{AC}$ is changed from 0 to 1, the routine proceeds to step S7 wherein control unit 8 sets an avoidance-control standby flag $F_{SB}$ at 1 ($F_{SB}=1$). Thereafter, the routine proceeds to step S10. When the determination at step S6 is affirmative, that is, when distance control operation flag $F_{AC}$ is changed from 1 to 0, the routine proceeds to step S8.

On the other hand, when the determination at step S5 is negative, that is, when switch signal $SW_D$ is set in OFF state, the routine proceeds to step S8 wherein control unit 8 determines whether or not distance-control operation flag $F_{AC}$ is set at 1. When the determination at step S8 is negative, that is, when $F_{AC}=0$, the routine proceeds to step S9 wherein control unit 8 sets avoidance-control standby flag $F_{SB}$ at 0 ($F_{SB}=0$). Thereafter, the routine proceeds to step S10. When the determination at step S8 is affirmative, the routine proceeds to step S7.

At step S10 subsequent to the execution of step S7, control unit 8 calculates vehicle speed V of the host vehicle from an average of wheel speeds $Vw_{FL}$ and $Vw_{FR}$ of front-left and front-right wheels 5FL and 5FR which are non-driving wheels ($V-(Vw_{FL}+Vw_{FR})/2$). Herein, if the host vehicle is equipped with an anti-lock brake system, an estimated vehicle-body speed may be employed as vehicle speed V. Further, vehicle speed V may be simply calculated from a rotation speed of an output shaft of automatic transmission 10.

At step S11 subsequent to the execution of step S10, control unit 8 determines whether or not distance-control operation flag $F_{AC}$ is set at 1. When the determination at step S11 is affirmative ($F_{AC}=1$), the routine proceeds to step 12 wherein the inter-vehicle distance control processing is executed. Thereafter, the routine proceeds to step S13. When the determination at step S11 is negative, the routine directly proceeds to step S13.

At step S13, control unit 8 determines whether or not avoidance-control standby flag $F_{SB}$ is set at 1. When the determination at step S13 is affirmative ($F_{SB}=1$), the routine proceeds to step S14 wherein control unit 8 executes a deviation avoidance control processing. Thereafter, the present timer interruption routine is terminated. When the determination at step S13 is negative ($F_{SB}=0$), the routine directly proceeds to a return step to terminate the present timer interruption routine.

Next, the inter-vehicle distance control processing of step S12 in FIG. 2 will be discussed with reference to a flowchart of FIG. 3.

At step S21, control unit 8 calculates a target inter-vehicle distance $L_X*$ on the basis of vehicle speed V using the following expression (1):

$$L_X*=K_{V1} \cdot V+K_{V2} \quad (1)$$

where $K_{V1}$ and $K_{V2}$ are controlled constants changed according to target inter-vehicle distance $L_{Xj}*$ selected via distance selecting switch 26. These controlled constants are set at larger values as the selected target inter-vehicle distance $L_{Xj}*$ becomes larger such as according to the change in the order of $L_{XS}*$, $L_{XM}*$, and $L_{XL}*$.

At step S22, control unit 8 calculates a target vehicle speed V on the basis of a set vehicle speed Vc set by the driver, inter-vehicle distance $L_X$, target inter-vehicle distance $L_X*$, a relative speed $L_X'$ obtained by differentiating inter-vehicle distance $L_X$, and vehicle speed V, using the following expression (2):

$$V*=\min(Vc, V+K_{LP} \cdot (L_X-L_X*)+KLD \cdot L_X') \quad (2)$$

where $K_{LP}$ and $K_{LD}$ are control gains, and min(a, b) is a function for selecting a smaller one of a and b.

At step S23, control unit 8 calculates a target acceleration $G_L*$ on the basis of vehicle speed V and target vehicle speed V* using the following expression (3):

$$G_L*=Kp \cdot \epsilon+Ki \cdot \int \epsilon dt+Kd \cdot d\epsilon/dt \quad (3)$$

where $\epsilon=V*-V$, and target acceleration $G_L*$ takes a positive value when the vehicle is accelerated.

Figure 2:
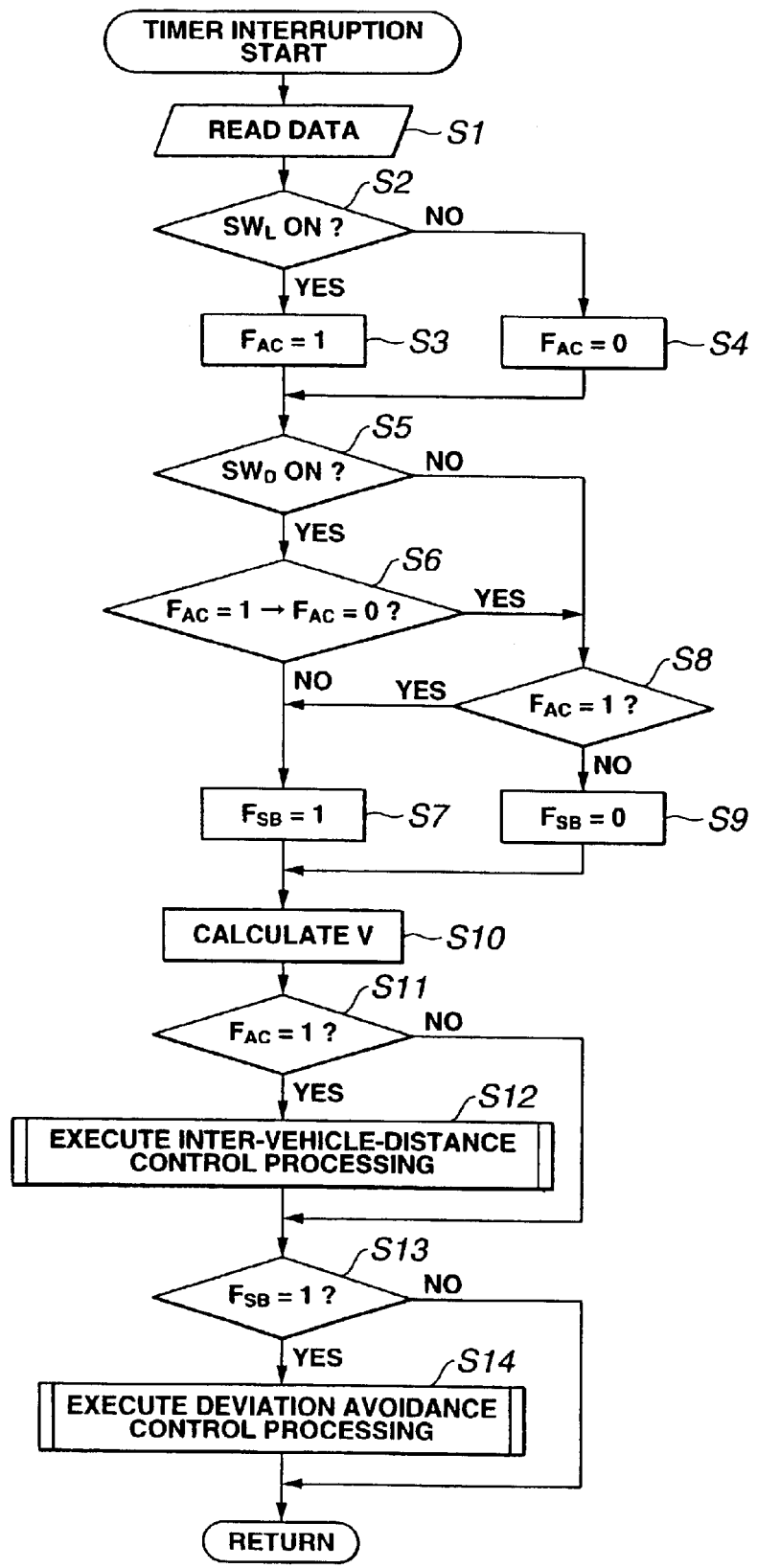
FIG. 2 is a flowchart showing an information processing executed by a driving/braking force control unit of FIG. 1.
Figure 3:
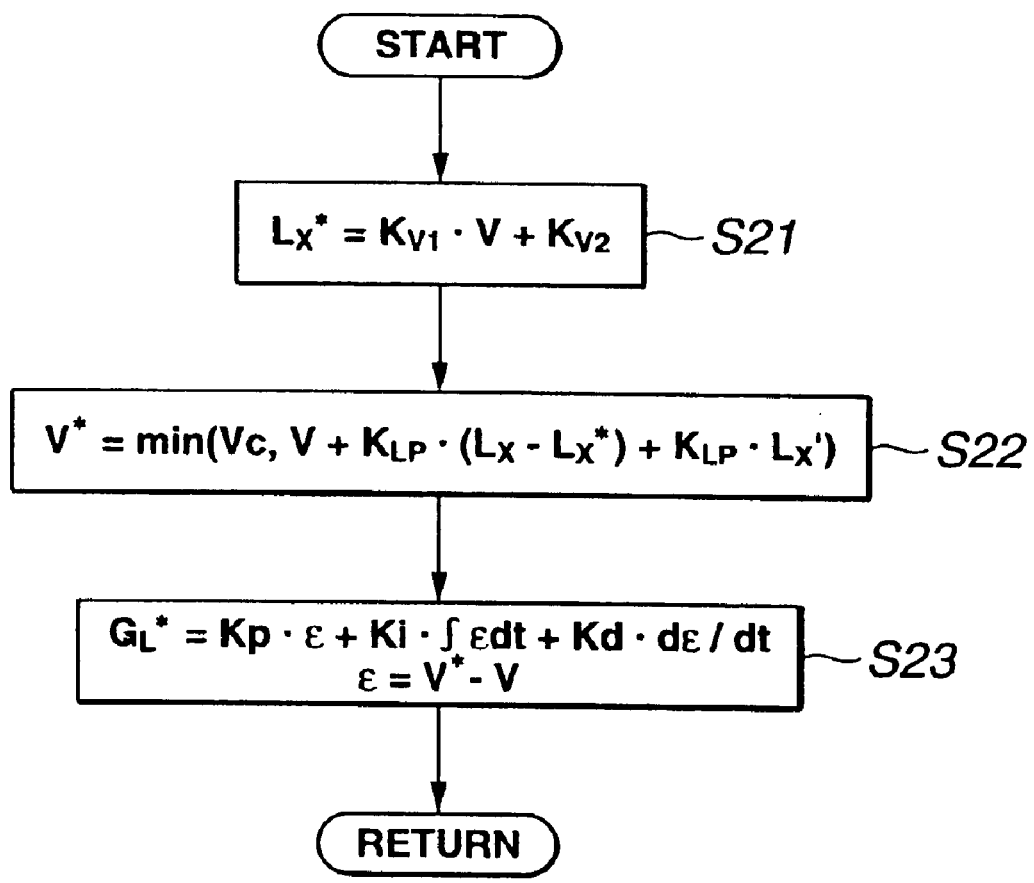
FIG. 3 is a flowchart showing an inter-vehicle distance control processing in FIG. 2.

With this processing of the flowchart in FIG. 3, control unit 8 executes the inter-vehicle distance control so as to bring inter-vehicle distance $L_X$ closer to target inter vehicle distance $L_X*$. Thereafter, the present processing is terminated and jumps to step S13 in FIG. 2.

Figure 4:
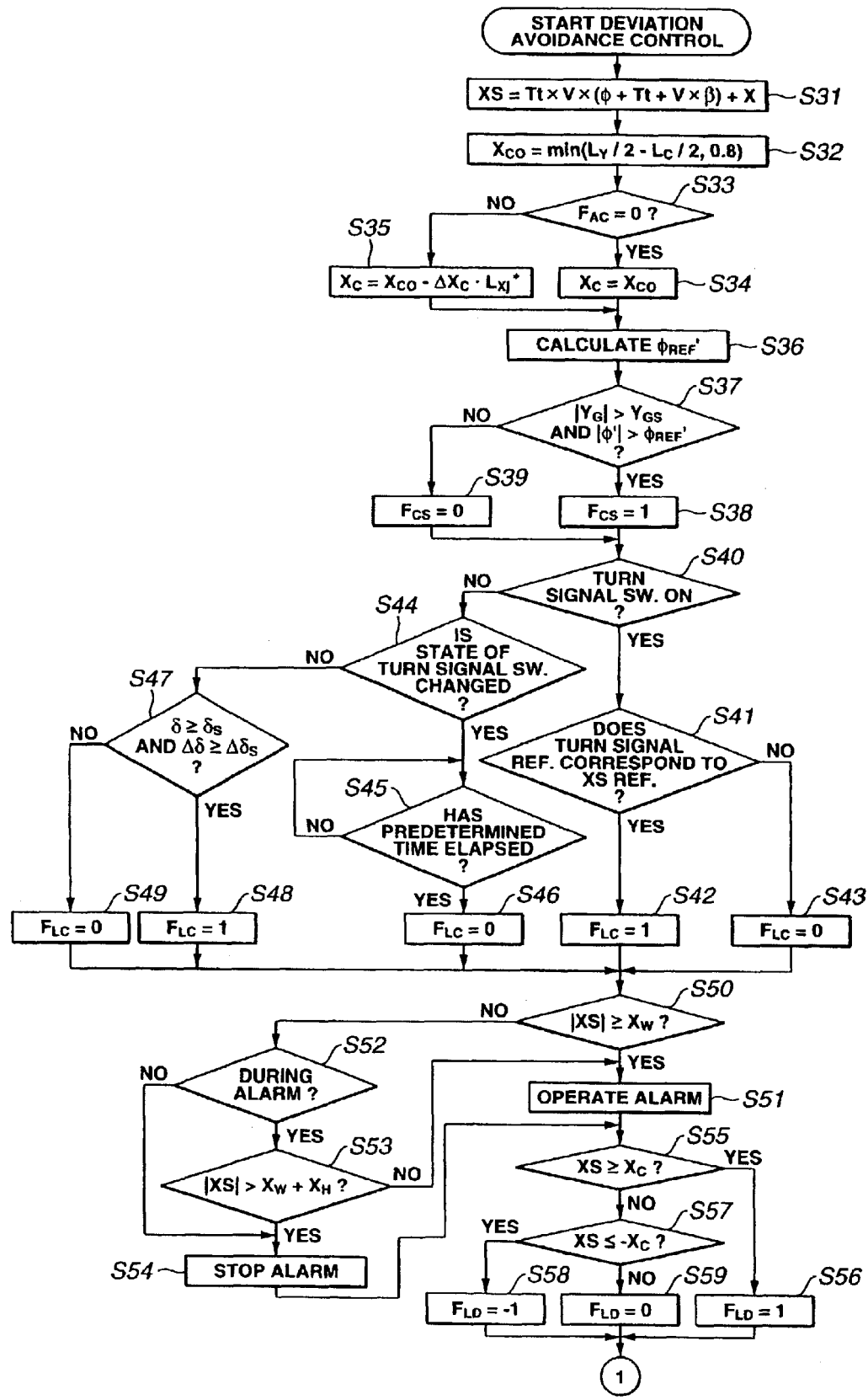
FIG. 4 is a flowchart showing a front part of a deviation avoidance control processing in FIG. 2.
Figure 5:
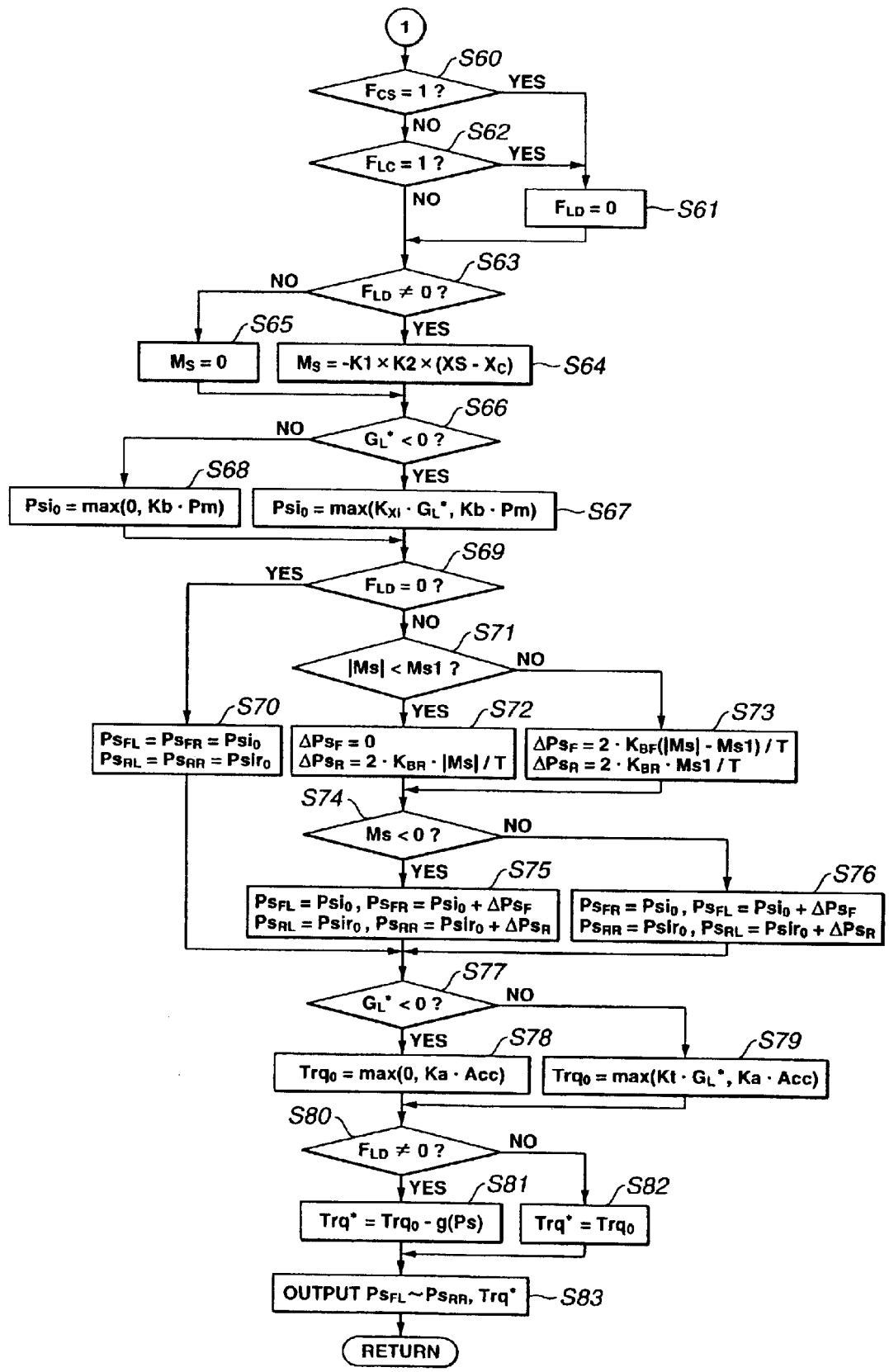
FIG. 5 is a flowchart showing a rear part of the deviation avoidance control processing in FIG. 2.

Referring to FIGS. 4 and 5, there will be discussed the lane-deviation avoidance control processing executed at step S14 of FIG. 2.

At step S31, control unit 8 calculates a deviation estimate XS corresponding to an estimated future lateral displacement. More specifically, by using yaw angle φ, lateral displacement X, curvature β and vehicle speed V, control unit 8 calculates deviation estimate XS from the following expression (4):

$$XS=Tt \times V \times (\phi+Tt \times V \times \beta)+X, \quad (4)$$

where Tt is a vehicle headway time for calculating a front remarking distance, and the front remarking distance is calculated by multiplying vehicle headway time Tt and vehicle speed V of the host vehicle. That is, when deviation estimate XS at a moment that vehicle headway time Tt elapsed is greater than or equal to a lateral-displacement limit value $X_C$, control unit 8 determines that there is a possibility that the host vehicle deviates the traveling lane or a tendency that the host vehicle is deviating from the center of the traveling lane. When the deviation possibility or deviation tendency proceeds leftward, deviation estimate XS takes a positive value. When proceeds rightward, deviation estimate XS takes a negative value. When the detection of the lane markers is not clearly executed due to unclearness of the lane markers caused by wearing or a weather factor such as snowing, the parameters indicative of yaw angle φ, lateral displacement X, curvature β, and width L are set at zero. Therefore, deviation estimate XS is also set at zero under this condition.

At step S32, control unit 8 calculates an initial value of a lateral displacement limit value $X_C$ used as a deviation determination threshold using the following expression (5):

$$X_{C0} = \min(L_Y/2 - L_C/2, 0.8) \quad (5)$$

where $L_C$ is a width of the host vehicle equipped with the lane-keep control system, min(a, b) is a function for selecting a minimum value of a and b, and 0.8 (meter) is determined from a lane width 3.35 m of a highway in Japan. Further, when a road infrastructure will be built in the future and when it becomes possible to obtain a lane width by means of a telecommunication between the host vehicle and the road infrastructure, such information may be employed. Further, when a distance $L_Y/2-XS$ to a lane marker at a deviation side is obtained from the infrastructure such as a signal marker embedded in the traveling road, such information may be employed to obtain lateral displacement limit value $Xc_0$.

At step S33, control unit 8 reads distance control operation flag $F_{AC}$ and determines whether or not distance control operation flag $F_{AC}$ is set at 0. When the determination at step S33 is affirmative ($F_{AC}=0$), control unit 8 determines that the inter-vehicle distance control is inoperative, and the routine proceeds to step S34 wherein control unit 8 sets lateral displacement limit value $X_C$ at initial value $X_{C0}$ ($X_C=X_{C0}$). Then, the routine proceeds to step S36. When the determination at step S32 is negative ($F_{AC}=1$), control unit 8 determines that the inter-vehicle distance control is operating, and the routine proceeds to step S35 wherein control unit 8 calculates lateral displacement limit value $X_C$ on the basis of initial value $X_{C0}$ and target inter-vehicle distance selected value $V_{Xj}*$ using the following expression (6).

$$X_C = X_{C0} - \Delta X_C \cdot L_{Xj}* \quad (6)$$

where $\Delta X_C$ is a preset value for determining a variation according to target inter-vehicle distance selected value $L_{Xj}*$. This predetermined value $\Delta X_C$ may be changed according to target inter-vehicle distance selected value $L_{XS}*$, $L_{Xj}*$, $L_{Xj}*$.

Thereafter, the routine proceeds from step S35 to step S36.

Figure 6:
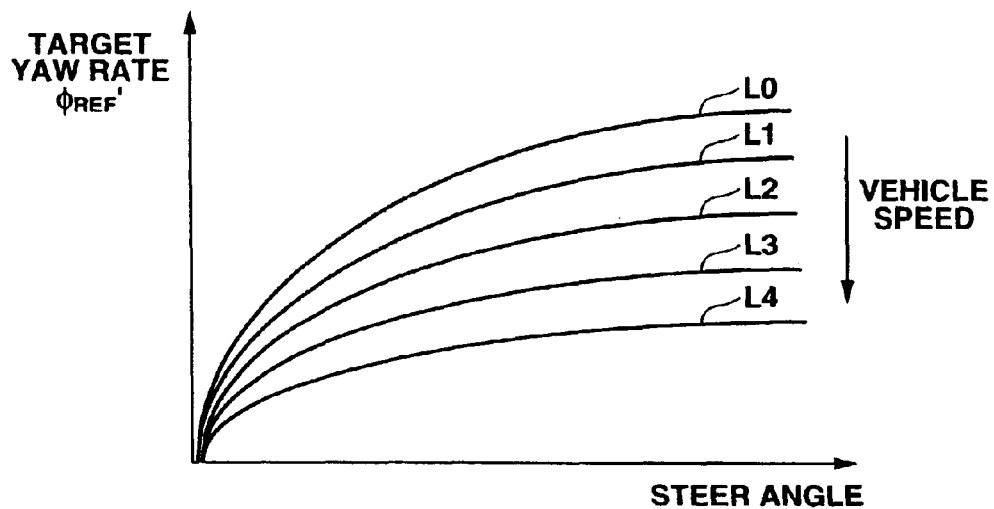
FIG. 6 is a control map employed in the processing of FIG. 4.

At step S36, control unit 8 calculates a target yaw rate $\phi_{REF}'$ on the basis of steer angle δ detected by steer angle sensor 19 and vehicle speed V calculated at step S10 and with reference to a target yaw rate calculation map shown in FIG. 6. The target yaw rate calculation map represents a relationship between steer angle δ and target yaw rate $\phi_{REF}'$ using vehicle speed V as a parameter. Under a low-speed vehicle traveling condition, when steer angle δ is zero (δ=0), target yaw rate $\phi_{REF}'$ becomes zero ($\phi_{REF}'=0$). Characteristic curves L0, L1, L2, L3 and L4 are set such that target yaw rate $\phi_{REF}'$ steeply increases according to the increase of steer angle δ during an initial condition and thereafter slowly increases. Further, characteristic curves L0 through L4 are further set such that target yaw rate $\phi_{REF}'$ decreases according as vehicle speed V increases. That is, according to the increase of vehicle speed V, selected characteristic curve is changed from L0 to L4, gradually.

At step S36, control unit 8 determines whether or not the host vehicle is put in a steeply turning condition where an absolute value $|Y_G|$ is greater than a lateral displacement set value $Y_{GS}$ and an absolute value $|\phi'|$ of yaw rate φ' is greater than target yaw rate $\phi_{REF}'$. That is, when $|Y_G|>Y_{GS}$ and $|\phi'|>\phi_{REF}'$, control unit 8 determines that the host vehicle is in the steep-turn condition. Therefore, control unit 8 determines that the host vehicle is put in an unstable condition. Accordingly when the determination at step S37 is affirmative, the routine proceeds to step S38 wherein a vehicle unstable flag $F_{CS}$ is set at 1 ($F_{CS}=1$). Then, the routine proceeds to step S40. When the determination at step S37 is negative, that is, when $|Y_G| \leq Y_{GS}$ or $|\phi_{REF}'|$, control unit 8 determines that the host vehicle is put in a stable condition. Therefore, the routine proceeds to step S39 wherein vehicle unstable flag $F_{CS}$ is reset ($F_{CS}=0$). Then, the routine proceeds to step S40.

At step S40, control unit 8 determines whether or not turn-signal switch 20 is set in ON state. When the determination at step S40 is affirmative, that is, when turn-signal switch 20 is set in ON state, the routine proceeds to step S41 wherein control unit 8 determines whether or not a plus/minus sign of a turn-direction indicative signal WS of turn-signal switch 20 corresponds to a plus/minus sign of deviation estimate XS. When the determination at step S41 is affirmative, that is, when both of plus/minus signs of turn-direction indicative signal WS and deviation estimate XS are the same plus/minus sign (+ or –), control unit 8 determines that the lane change is executed according to the driver's intent, and the routine proceeds to step S42 wherein control unit 8 sets a lane change flag $F_{LC}$ at 1 ($F_{LC}=1$) which indicates there is the driver's intent. Thereafter, the routine proceeds to step S50. When the determination at step S41 is negative, that is, when control unit 8 determines that the lane change is not executed, the routine proceeds to step S43 wherein control unit 8 resets lane change flag $F_{LC}$ ($F_{LC}=0$).

On the other hand, when the determination at step S40 is negative, that is, when turn-signal switch 20 is set in OFF state, the routine proceeds to step S44 wherein control unit 8 determines whether or not the switch condition of turn-signal switch 20 is changed from ON condition to OFF condition. When the determination at step S44 is affirmative, control unit 8 determines that the lane change has just finished. Therefore, the routine proceeds to step S45.

At step S45 subsequent to the affirmative determination at step S44, control unit 8 determines whether or not a predetermined time period such as 4 seconds has elapsed from the affirmative determination at step S44. This step S45 is repeated until the affirmative determination is made. When the determination at step S45 becomes affirmative, the routine proceeds to step S46 wherein control unit 8 resets lane change flag $F_{LC}$ ($F_{LC}=0$). Thereafter, the routine proceeds to step S50.

When the determination at step S44 is negative, that is, when the switch condition of turn-signal switch 20 is not changed from ON condition to OFF condition, the routine proceeds to step S47 wherein control unit 8 determines whether steer angle δ is greater than or equal to a preset value $δ_S$ and a steer angle deviation Δδ is greater than or equal to a preset value $Δδ_S$. When the determination at step S47 is affirmative, that is, when $δ \geq δ_S$ and $Δδ \geq Δδ_S$, control unit 8 determines that the driver intends to execute a lane change. Therefore, the routine proceeds to step S48 wherein control unit 8 sets lane change flag $F_{LC}$ at 1 ($F_{LC}=1$).

Thereafter, the routine proceeds to step S50. When the determination at step S47 is negative, that is, when $\delta<\delta_S$ or $\Delta\delta<\Delta\delta_s$, control unit 8 determines that the driver does not intend to execute the lane change. Therefore, the routine proceeds to step S49 wherein control unit 8 resets lane change flag $F_{LC}$ ($F_{LC}=0$). Thereafter, the routine proceeds to step S50.

At step S50, control unit 8 determines whether or not an absolute value |XS| of deviation estimate XS is greater than or equal to an alarm threshold $X_W$ which is obtained by subtracting a margin $X_M$ from lateral displacement limit value $X_C$ ($X_W=X_C-X_M$), where the margin $X_M$ corresponds to a time lag from a starting moment of the alarm operation to a starting moment of the deviation avoidance control. When the determination at step S50 is affirmative (|XS| $\geq X_W$), control unit 8 determines that the host vehicle is put in a lane-deviation condition. Therefore, the routine proceeds to step S51 wherein control unit 8 outputs alarm signal AL to alarm device 21. Then, the routine proceeds to step S55.

On the other hand, when the determination at step S50 is negative (|XS|<$X_W$), control unit 8 determines that the host vehicle is not put in the lane-deviation condition. Therefore, the routine proceeds to step S52 wherein control unit 8 determines whether the alarm operation is being executed or not. When the determination at step S52 is affirmative, the routine proceeds to step S53 wherein control unit 8 determines whether absolute value |XS| of deviation estimate XS is greater than a value obtained by adding a hysteresis value $X_H$ to alarm threshold $X_W$, where hysteresis value $X_H$ is a value employed for preventing a hunting of the alarm operation. When the determination at step S53 is affirmative (|XS|>$X_W+X_H$), the routine proceeds to step S54 wherein control unit 8 stops outputting alarm signal AL to alarm device 21. When the determination at step S53 is negative (|XS|$\leq X_W+X_H$), control unit 8 determines that the alarm operation is continued, and therefore the routine proceeds to step S51.

At step S55 subsequent to the execution of step S51 or S54, control unit 8 determines whether or not deviation estimate XS is greater than or equal to lateral-displacement limit value $X_C$. When the determination at step S55 is affirmative (XS$\geq X_C$), control unit 8 determines that the host vehicle will deviate leftward from the traveling lane. Therefore, the routine proceeds to step S56 wherein control unit 8 sets deviation determination flag $F_{LD}$ at 1 ($F_{LD}=1$). When the determination at step S55 is negative (XS<$X_C$), the routine proceeds to step S57 wherein control unit 8 determines whether or not deviation estimate XS is smaller than or equal to a negative value -$X_C$ of lateral-displacement limit value $X_C$. When the determination at step S57 is affirmative (XS$\leq -X_C$), control unit 8 determines that the host vehicle will deviate rightward from the traveling lane. Therefore, the routine proceeds to step S58 wherein control unit 8 sets deviation determination flag $F_{LD}$ at -1 ($F_{LD}=-1$). When the determination at step 57 is negative (XS>-$X_C$), control unit 8 determines that the host vehicle will not deviate from the traveling lane. Therefore, the routine proceeds to step S59 wherein control unit 8 sets deviation determination flag $F_{LD}$ at 0 ($F_{LD}=0$) At At step S60 subsequent to the execution of step S56, S57 or S58, control unit 8 determines whether or not vehicle unstable flag $F_{CS}$ is set at 1. When the determination at step S60 is affirmative ($F_{CS}=1$), the routine proceeds to step S61 wherein control unit 8 resets deviation determination flag $F_{LD}$ ($F_{LD}=0$). Thereafter, the routine proceeds to step S63. When the determination at step S60 is negative ($F_{CS}=0$), the routine proceeds to step S62 wherein control unit 8 determines whether or not lane change flag $F_{LC}$ is set at 1. When the determination at step S62 is affirmative ($F_{LC}=1$), the routine proceeds to step S61. When the determination at step S62 is negative ($F_{LC}=0$), the routine proceeds to step S63.

Figure 7:
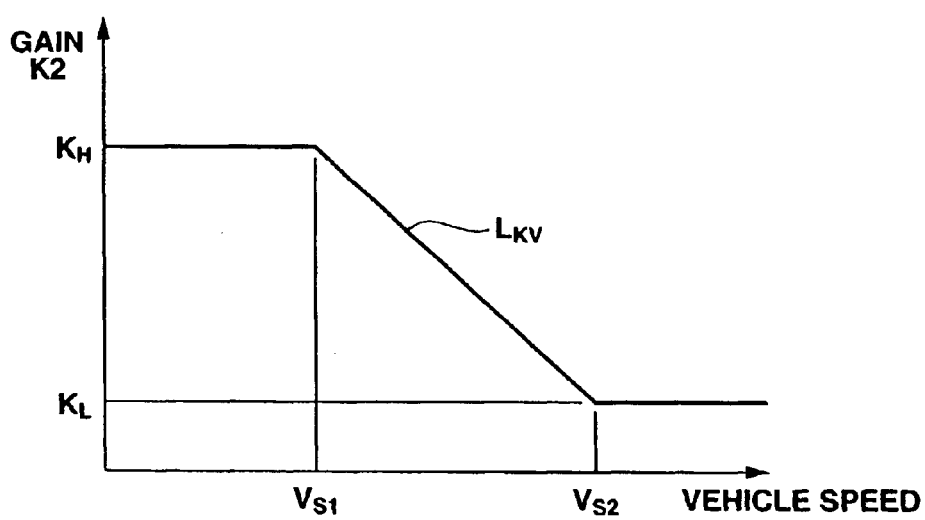
FIG. 7 is a control map employed in the processing of FIG. 5.

At step S63, control unit 8 determines whether or not deviation determination flag $F_{LD}$ takes a value except for zero. When the determination at step S63 is affirmative ($F_{LD}\neq 0$), the routine proceeds to step S64 wherein control unit 8 calculates a target yawing moment Ms using the following expression (7). Then, the routine proceeds to step S66.

$$M_S=-K1\times K2\times(XS-X_C) \tag{7}$$

where K1 is a constant determined from the specification of the vehicle, and K2 is a gain set according to vehicle speed V with reference to a gain map shown in FIG. 7. As is clearly shown in FIG. 7, a characteristic line $L_{KV}$ indicative of a relationship between gain K2 and vehicle speed V are set such that when vehicle speed V ranges from zero to a predetermined low value $V_{S1}$, gain K2 is fixed at a relatively large value $K_H$, that when vehicle speed V is within a range from $V_{S1}$ to a predetermined high value $V_{S2}$, gain K2 is decreased according to the increase of vehicle speed V, and that when vehicle speed V is higher than predetermined high value $V_{S2}$, gain K2 is fixed at a relatively small value $K_L$.

When the determination at step S63 is negative, that is, when $F_{LD}=0$, the routine proceeds to step S65 wherein control unit 8 sets target yawing moment Ms at zero (Ms=0). Thereafter, the routine proceeds to step S66.

At step S66, control unit 8 determines whether or not target acceleration $G_L$* obtained in the inter-vehicle distance control processing is a negative value. When the determination at step S66 is affirmative ($G_L$*<0), the routine proceeds to step S67 wherein control unit 8 calculates basic brake hydraulic pressure $Psi_0$ (i=FL, FR, RL, RR) using the following expression (8). Then, the routine proceeds to step S69.

$$Psi_0=\max(Kxi\cdot G_L*, Kb\cdot Pm) \tag{8}$$

where Kxi and Kb are coefficients determined from a brake specification including a brake pad coefficient $\mu$ of each wheel, a wheel-cylinder area, a rotor effective diameter, and a tire effective diameter, and max(a, b) is a function for selecting a maximum value in a and b.

When the determination at step S66 is negative ($G_L$*$\geq 0$), the routine proceeds to step S68 wherein control unit 8 calculates basic brake hydraulic pressures $Psi_0$ using the following expression (9). Then, the routine proceeds to step S69.

$$Psi_0=\max(0, Kb\cdot *Pm) \tag{9}$$

At step S69, control unit 8 determines whether deviation determination flag $F_{LD}$ is set at 0. When the determination at step S69 is affirmative ($F_{LD}=0$), the routine proceeds to step S70 wherein control unit 8 sets a front-left-wheel target hydraulic pressure $Ps_{FL}$ and a front-right-wheel target hydraulic pressure $Ps_{FR}$ at basic brake hydraulic pressure $Psi_0$ as shown by the following expression (10). Further, control unit 8 sets a rear-left-wheel target hydraulic pressure $Ps_{RL}$ and a rear-right-wheel target hydraulic pressure $Ps_{RR}$ at a rear-wheel basic hydraulic pressure $Psir_0$, which is calculated from basic brake hydraulic pressure $Psi_0$ taking account of a distribution between front wheels and rear wheels, as shown by the following expression (11). Thereafter, the routine proceeds to step S77.

$$Ps_{FL}=Ps_{FR}=Psi_0 \quad (10)$$

$$Ps_{RL}=Ps_{RR}=Psir_0 \quad (11)$$

When the determination at step S69 is negative ($F_{LD}\neq 0$), the routine proceeds to step S71 wherein control unit 8 determines whether or not an absolute value $|M_S|$ of target yawing moment $M_S$ is smaller than a preset value $M_S1$. When the determination at step S71 is affirmative ($|M_S|<M_S1$), the routine proceeds to step S72 wherein control unit 8 sets target brake hydraulic pressure difference $\Delta Ps_F$ for the front wheels 5FL and 5FR at 0 using the following expression (12) and sets target brake hydraulic pressure difference $\Delta Ps_R$ for the rear wheels 5RL and 5RR at $2 \cdot K_{BR} \cdot |Ms|/T$ using the following expression (13).

$$\Delta Ps_F=0 \quad (12)$$

$$\Delta Ps_R=2 \cdot K_{BR} \cdot |Ms|/T \quad (13)$$

Then, the routine proceeds to step S74.

On the other hand, when the determination at step S71 is negative ($|Ms| \geq Ms1$), the routine proceeds to step S73 wherein control unit 8 sets target brake hydraulic pressure difference $\Delta Ps_F$ for the front wheels 5FL and 5FR at $2 \cdot K_{BR} \cdot (|Ms|-Ms1)/T$ using the following expression (14) and sets target brake hydraulic pressure difference $\Delta Ps_R$ for the rear wheels 5RL and 5RR at $2 \cdot K_{BR} \cdot Ms1/T$ using the following expression (15). Then, the routine proceeds to step S74.

$$\Delta P_{SF}=2 \cdot K_{BR} \cdot (|Ms|-Ms1)/T \quad (14)$$

$$\Delta P_{SR}=2 \cdot K_{BR} \cdot Ms1/T \quad (15)$$

where T is a tread which is common in front wheels and rear wheels for the sake of simplicity, and $K_{BF}$ and $K_{BR}$ are conversion coefficients employed for converting the braking force into the brake hydraulic pressure and are determined from the specifications of the brake system. At step S73, control unit 8 may set target brake hydraulic pressure difference $\Delta Ps_F$ for the front wheels 5FL and 5FR at $2 \cdot K_{BR} \cdot |Ms|/T$ and generates the braking force difference only at the front wheels.

At step S74, control unit 8 determines whether or not the host vehicle tends to deviate leftward by determining whether target yawing moment Ms takes a negative value or not. When the determination at step S74 is affirmative (Ms<0), the routine proceeds to step S75 wherein control unit 8 sets target brake pressure $Ps_{FL}$ for front-left wheel 5FL at $Psi_0$ using the following expression (16), sets target brake pressure $Ps_{FR}$ for the front-right wheel 5FR at $Psi_0+\Delta Ps_F$ using the following expression (17), sets target brake pressure $Ps_{RL}$ for rear-left wheel 5RL at $Psir_0$ using the following expression (18), and sets target brake pressure $Ps_{RR}$ for the rear-right wheel 5RR at $Psir_0+\Delta Ps_F$ using the following expression (19). Then, the routine proceeds to step S46.

$$Ps_{FL}=Psi_0 \quad (16)$$

$$Ps_{FR}=Psi_0+\Delta Ps_F \quad (17)$$

$$Ps_{RL}=Psir_0 \quad (18)$$

$$Ps_{RR}=Psir_0+\Delta Ps_R \quad (19)$$

On the other hand, when the determination at step S71 is negative (Ms≧0), the routine proceeds to step S73 wherein control unit 8 sets target brake pressure $Ps_{FL}$ for front-left wheel 5FL at $Psi_0+\Delta Ps_F$ using the following expression (20), sets target brake pressure $Ps_{FR}$ for the front-right wheel 5FR at $Psi_0$ using the following expression (21), sets target brake pressure $Ps_{RL}$ for rear-left wheel 5RL at $Psir_0+\Delta Ps_F$ using the following expression (22), and sets target brake pressure $Ps_{RR}$ for the rear-right wheel 5RR at $Psir_0$ using the following expression (23). Then, the routine proceeds to step S77.

$$Ps_{FL}=Psi_0+\Delta Ps_F \quad (20)$$

$$Ps_{FR}=Psi_0 \quad (21)$$

$$Ps_{RL}=Psir_0+\Delta Ps_R \quad (22)$$

$$Ps_{RR}=Psir_0 \quad (23)$$

At step S77, control unit 8 determines whether or not target acceleration $G_L^*$ obtained in the inter-vehicle distance control processing is a negative value. When the determination at step S77 is affirmative ($G_L^*<0$), the routine proceeds to step S78 wherein control unit 8 calculates a reference driving torque $Trq_0$ using the following expression (24). Then, the routine proceeds to step S80.

$$Trq_0=\max(0, Ka \cdot Acc) \quad (24)$$

When the determination at step S77 is negative ($G_L^* \geq 0$), the routine proceeds to step S79 wherein control unit 8 calculates reference driving torque $Trq_0$ using the following expression (25). Then, the routine proceeds to step S80.

$$Trq_0=\max(Kt \cdot G_L^*, Ka \cdot Acc) \quad (25)$$

At step S80, control unit 8 determines whether or not deviation determination flag $F_{LD}$ takes a value except for zero. When the determination at step S80 is affirmative ($F_{LD} \neq 0$), the routine proceeds to step S81 wherein control unit 8 calculates target driving torque $Trq^*$ using the following expression (26). Thereafter, the routine proceeds to step S83.

$$Trq^*=Trq_0-g(Ps) \quad (26)$$

where Ps is a sum of target brake pressure differences generated by the lane-keep control ($Ps=Ps_F+Ps_R$), and g(Ps) is a function for calculating a predicted brake torque which will be generated by the brake hydraulic pressure.

When the determination at step S80 is negative ($F_{LD}=0$), the routine proceeds to step S82 wherein control unit 8 calculates target driving torque $Trq^*$ using the following expression (27). Thereafter, the routine proceeds to step S83.

$$Trq^*=Trq_0 \quad (27)$$

At step S83, control unit 8 outputs target brake pressures $Ps_{FL}$, $Ps_{FL}$, $Ps_{RL}$ and $Ps_{RR}$ to brake hydraulic control circuit 7 and outputs target driving torque $Trq^*$ to driving torque control unit 12. Then, the routine proceeds to a return step to terminate the present timer interruption routine and to return a main routine of FIG. 2.

In this processing shown in FIGS. 2 through 5, the processing of steps S1 and S10, CCD camera 13, camera controller 14, acceleration sensor 14 and yaw rate sensor 16 correspond to travel condition detecting means. The processing of steps S14 and the processing of FIG. 3 correspond to inter-vehicle distance control means. The processing of steps S2 through S9, S13 and S14 and the processing in FIGS. 4 and 5 correspond to deviation avoidance control means. The processing of steps S33 through S35 corresponds to control start timing changing means. Processing of steps S55 through S61 corresponds to deviation determining means. The processing of steps S63 through S65 corresponds to target yawing moment calculating means. The processing of steps S66 through S82 corresponds to driving/braking force controlled variable calculating means. The processing of step S83, brake hydraulic control circuit 7 and driving torque control unit 12 correspond to power distribution control means. The target yawing moment calculating means, the driving/braking force controlled variable calculating means and the power distribution control means construct driving/braking force control means.

Accordingly, when the host vehicle is traveling without executing the braking operation and when inter-vehicle distance control starting switch 25 is set in OFF state to output switch signal $SW_L$ indicative of OFF state, the routine in FIG. 2 proceeds from step S2 to step S4 wherein distance control operation flag $F_{AC}$ is reset ($F_{AC}=0$). Therefore, the routine jumps from step S11 to step S13 without executing the inter-vehicle-distance control at step S13.

When the driver turns on deviation-avoidance control starting switch 23 so as to set switch signal $SW_D$ in ON state under this condition, the routine proceeds from step S5 to step S6. Further, since distance control operation flag $F_{AC}$ has been reset ($F_{AC}=0$), the routine proceeds from step S6 to step S7 wherein control unit 8 sets deviation avoidance control standby flag $F_{SB}$ is set at 1 ($F_{SB}=1$). Therefore, the routine proceeds from step S13 to S14 wherein the deviation avoidance control processing shown in FIGS. 4 and 5 is executed.

At this moment, when the host vehicle is traveling straight on a center of the straight traveling lane, yaw angle φ outputted from camera controller 14, lateral displacement X relative to the center of the traveling lane and curvature β of the traveling lane respectively take almost zero (φ≅0, X≅0, β≅0). Further, lateral acceleration $Y_G$ detected by acceleration sensor 15 and yaw rate φ' detected by yaw rate sensor 16 take almost zero ($Y_G$≈0, φ'≈0). Accordingly, deviation estimate XS calculated at step S31 takes almost zero (XS≈0).

When a width $L_C$ of the host vehicle is smaller than 1.75 m and when a lane width $L_Y$ is 3.35 m, a value ($L_Y/2-L_C/2$) becomes greater than 0.8 m. On the other hand, when a width $L_C$ of the host vehicle is greater than 1.75 m and when a lane width $L_Y$ is 3.35 m, value ($L_Y/2-L_C/2$) becomes smaller than 0.8 m. Therefore, at step S32, value ($L_Y/2-L_C/2$) is employed as initial value $X_{C0}$ of the lateral displacement limit value.

Furthermore, since both of lateral acceleration $Y_G$ and yaw rate φ' take almost zero, the routine proceeds from step S37 to step S39 wherein vehicle unstable flag $F_{CS}$ is reset ($F_{CS}=0$) Further, when the driver does not intend to execute the lane change, that is, when turn signal switch 20 is set in OFF state and when steer angle δ and steer angle speed Δδ are almost zero (δ≅0, Δδ≅0), the routine proceeds from step 40 through steps S44 and S47 to step S49 wherein lane change flag $F_{LC}$ is resets ($F_{LC}=0$). Further, since deviation estimate XS takes almost zero (XS≅0), the routine proceeds from step S50 through steps S52, S54, S55 and S57 to step S59 wherein deviation determination flag $F_{LD}$ is reset ($F_{LD}=0$).

Accordingly, the routine in FIG. 5 proceeds through step S60, S62 to step S63 wherein the negative determination is made ($F_{LD}=0$). The routine therefore proceeds from step S63 to step S65 wherein target yawing moment Ms is set at zero (Ms=0).

Since the inter-vehicle distance control is not being executed and target acceleration $G_L$* is set at 0 ($G_L$*=0), the routine proceeds from step S66 to step S68 wherein brake hydraulic pressure initial value $Psi_0$ is set at 0 ($Psi_0=0$) since the brake system is inoperative and therefore master cylinder pressure Pm is zero (Pm=0). Further since $F_{LD}=0$, the affirmative determination is made at step S69, and the routine proceeds to step S70 wherein target brake pressures $Ps_{FL}$ and $Ps_{FR}$ of front wheels 5FL and 5FR are set at $Psi_0$ of 0 and target brake pressures $Ps_{RL}$ and $Ps_{RR}$ of rear wheels 5RL and 5RR are set at $Psir_0$ of 0.

Thereafter, the routine proceeds to step S77 wherein negative determination is made since target acceleration $G_L$* is set at zero ($G_L$*=0). Then the routine proceeds to step S79 wherein reference driving torque $Trq_0$ is set at Ka·Acc.

Thereafter, the routine proceeds to step S80. Since deviation determination flag $F_{LD}$ is set at 0 ($F_{LD}=0$), the routine proceeds from step S80 to step S82 wherein target driving torque Trq* is set at reference driving torque $Trq_0$. Then, at step S83, control unit 8 outputs target brake pressures $Ps_{FL}$, $Ps_{FR}$, $Ps_{RL}$ and $Ps_{RR}$ to brake hydraulic pressure control circuit 12 and outputs target driving torque Trq* to driving torque control unit 12.

Accordingly, brake hydraulic control circuit 7 controls the brake hydraulic pressure of each wheel cylinder 6FL, 6FR, 6RL, 6RR at 0 to maintain the inoperative state of the brake system. Further, driving force control unit 12 executes the engine control based on the accelerator opening Acc.

Subsequently, when the lane change is executed by the driver's intervention from the above-discussed traveling condition in that no lane-deviation is generated, turn signal switch 20 is turned on and outputs a switch signal indicative of rightward turn (or leftward turn). Under this turned-on state, the lane-change is started by controlling steering wheel 19. In reply to this turning operation, yaw angle φ outputted from camera controller 14 varies toward a positive direction (or negative direction), and lateral displacement X also varies toward a positive value (or negative value). Accordingly, before front-left wheel 5FL of the host vehicle crosses over a left-side lane marker, deviation estimate Xs calculated at step S31 becomes greater than alarm determination threshold $X_W$ ($X_W=X_C-X_M$) calculated based on initial value $X_{C0}$ of the lateral displacement limit value, and therefore alarm device 21 generates alarm. Thereafter, when deviation estimate XS becomes greater than or equal to lateral displacement limit value (XS≧$X_C$=$X_{C0}$), deviation determination flag $F_{LD}$ is set at 1 ($F_{LD}$1) at step S56.

In the event that the lane-change is executed according to the driver's intervention, since lane-change flag $F_{LC}$ is set at 1 ($F_{LC}=1$), the routine proceeds from step S62 to step 61 wherein deviation determination flag $F_{LD}$ is reset ($F_{LD}=0$). Therefore, target brake hydraulic pressures $Ps_{FL}$, $Ps_{FR}$, $Ps_{RL}$ and $Ps_{RR}$ are set at brake hydraulic pressure initial values $Psi_0$ and $Psir_0$ which are respectively set at 0. Consequently, no yawing moment due to the deviation avoidance control is not generated under this situation, and the driver can smoothly execute the lane change.

Further, when the host vehicle travels a winding road having continuous right and left curves, lateral acceleration $Y_G$ and yaw rate φ' of the host vehicle take large values, respectively. Therefore, at step S38, vehicle unstable flag $F_{CS}$ is set at 1 ($F_{CS}=1$). Further, the routine of FIG. 5 proceeds from step S60 to step S61 wherein deviation determination flag $F_{LD}$ is reset ($F_{LD}=0$). Consequently, even when the host vehicle travels a winding road, the lane-keep control system according to the present invention does not generate the yawing moment unnecessarily and enables the smooth steering operation.

On the other hand, when the vehicle travels toward the leftward deviation direction due to the leftward steering operation or the delay of the steering operation against the right corner under a condition that lane change flag $F_{LC}$ and vehicle unstable flag $F_{CS}$ are reset ($F_{LC}$=0 and $F_{CS}$=0) without the driver's intervention or without traveling a winding road, deviation estimate increases in the positive direction. If this condition is continued, alarm device 21 generates alarm at a moment that deviation estimate XS becomes greater than or equal to alarm operation threshold $X_W$. Further, when deviation estimate XS becomes greater than lateral displacement limit value $X_C$ (XS≧$X_C$=$X_{C0}$), the routine proceeds from step S55 to step S56 wherein deviation determination flag $F_{LD}$ is set at 1 ($F_{LD}$=1).

Therefore, the routine proceeds from step S63 to step S64 wherein target yawing moment of a negative value is obtained. Further, the routine proceeds from step S69 to step S71 wherein rear-wheel brake hydraulic pressure difference $\Delta Ps_R$ or both of front-wheel and rear wheel brake hydraulic pressure differences $\Delta Ps_F$ and $\Delta Ps_R$ is calculated based on the magnitude of target yawing moment Ms. Since target yawing moment Ms is a negative value, the routine proceeds to step S75 wherein front-right-wheel and rear-right-wheel target brake hydraulic pressures $Ps_{FR}$ and $Ps_{RR}$ are set at values, which are greater than front-left-wheel and rear-left-wheel target brake hydraulic pressures $Ps_{FL}$ and $Ps_{RL}$ set at zero. These setting of target brake hydraulic pressures generates a yawing moment for turning the host vehicle in the right side clockwise, and therefore the host vehicle returned from the lane deviation direction to the traveling lane.

During the deviation avoidance control, when switch signal $SW_L$ is turned on by the driver's operation for turning on inter-vehicle distance control starting switch 25, the routine of FIG. 2 proceeds from step S2 to step S3 wherein distance control operation flag $F_{AC}$ is set at 1 ($F_{AC}$=1). Therefore, the routine proceeds from step S11 to step S12 wherein the inter-vehicle distance control processing shown in FIG. 3 is started. Therefore, control unit 8 calculates target inter-vehicle distance $L_X^*$ on the basis of target inter-vehicle distance selected value $L_{Xj}$ selected by target inter-vehicle distance selecting switch 26. Further, control unit 8 calculates target acceleration $G_L^*$ so as to maintain the inter-vehicle distance $L_X$ at target inter-vehicle distance $L_X^*$. More specifically, when inter-vehicle distance $L_X$ detected by distance sensor 24 is greater than target inter-vehicle distance $L_X^*$, target acceleration $G_L^*$ taking a positive value is obtained and therefore the host vehicle is accelerated. On the other hand, when inter-vehicle distance $L_X$ is smaller than target inter-vehicle distance $L_X^*$, target acceleration $G_L^*$ taking a negative value is obtained and therefore the host vehicle is decelerated.

Thus, when $F_{AC}$=1, the routine in the deviation avoidance control processing in FIG. 4 proceeds from step S33 to step S35 wherein lateral displacement limit value $X_C$ is set at a value obtained by subtracting a multiple of target inter-vehicle distance select value $L_{Xj}^*$ and predetermined value $\Delta X_C$ from initial value $X_{C0}$ of the lateral displacement limit value.

Therefore, when the host vehicle tends to deviate leftward due to the leftward steering operation from a straight traveling state or due to the straight travel maintaining near the right side corner, deviation estimate XS calculated at step S31 increases toward the positive direction.

At this moment, lateral displacement limit value $X_C$ is set so as to be smaller than the value during the inoperative condition of the inter-vehicle distance control, that is, the initial value $X_{C0}$ of the lateral displacement limit value, by a reduced quantity $\Delta X_C \cdot L_{Xj}^*$. Accordingly, when deviation estimate XS reaches a threshold value smaller than that during the inoperative state of the inter-vehicle distance control, alarm device 21 generates alarm. Further, the deviation determination flag $F_{LD}$ is set at 1 at an earlier timing as compared with the timing during the inoperative state of the inter-vehicle distance control.

Consequently, at an earlier timing, target yawing moment Ms is calculated at step S64, and target hydraulic pressures $Ps_{FL}$, $Ps_{FR}$, $Ps_{RL}$ and $Ps_{RR}$ are calculated at steps S71 through S75. On the basis of the calculated target hydraulic pressures $Ps_{FL}$, $Ps_{FR}$, $Ps_{RL}$ and $Ps_{RR}$, the left-side wheel cylinders 6FL and 6RR generates braking force and therefore the host vehicle generates a clockwise yawing moment. This generation of the clockwise yawing moment enables the host vehicle to early way out of the lane-deviation tendency.

When inter-vehicle distance control starting switch 25 is turned off under this condition, inter-vehicle distance control operation flag $F_{AC}$ is reset ($F_{AC}$=0) at step S4 in reply to the OFF state of switch signal $SW_L$. Further, since deviation-avoidance control starting switch 23 is kept at ON state, the routine proceeds from step S5 to step S6 wherein the affirmative determination is made due to the change of inter-vehicle distance control operation flag $F_{AC}$ from 1 to 0. Accordingly, the routine proceeds through step S8 to step S9 wherein deviation avoidance control standby flag $F_{SB}$ is reset ($F_{SB}$=0) and therefore the deviation avoidance control processing is also terminated.

On the other hand, under a condition that neither of the deviation avoidance control nor the inter-vehicle distance control is executed due to the OFF state of both of deviation-avoidance control start switch 23 and inter-vehicle distance control starting switch 25, when the driver turns on only the inter-vehicle distance control starting switch 25, that is, when switch signal $SW_L$ is set in ON state, the routine of FIG. 2 proceeds from step S2 to step S3 wherein distance control operation flag $F_{AC}$ is set at 1 ($F_{AC}$=1). At this moment, since deviation-avoidance control starting switch 23 is set in OFF state, the routine proceeds from step S5 through step S8 to step S7 wherein deviation avoidance control standby flag $F_{SB}$ is set at 1 ($F_{SB}$=1).

Accordingly, the routine proceeds to step S12 wherein the inter-vehicle distance control processing is started. That is, when the driver starts the inter-vehicle distance control for the purpose of decreasing the work during the driving operation, the deviation avoidance control is also started interlocking with the inter-vehicle distance control. This enables the driver to continue the safety driving while decreasing the work for the driving operation.

Further, if inter-vehicle distance control starting switch 25 is turned off at this moment, distance control operation flag $F_{AC}$ is reset ($F_{AC}$=0). Accordingly, the routine of FIG. 2 proceeds from step S8 to step S9 wherein deviation avoidance control standby flag $F_{SB}$ is reset ($F_{SB}$=0), and therefore both of the inter-vehicle distance control and the deviation avoidance control are terminated.

Furthermore, when the host vehicle is put in the rightward deviation tendency, the brake hydraulic pressure of the left side cylinder wheels 6FL and 6RL are increased, and the yawing moment for turning the host vehicle leftward is generated to avoid the lane deviation of the host vehicle.

Figure 8:
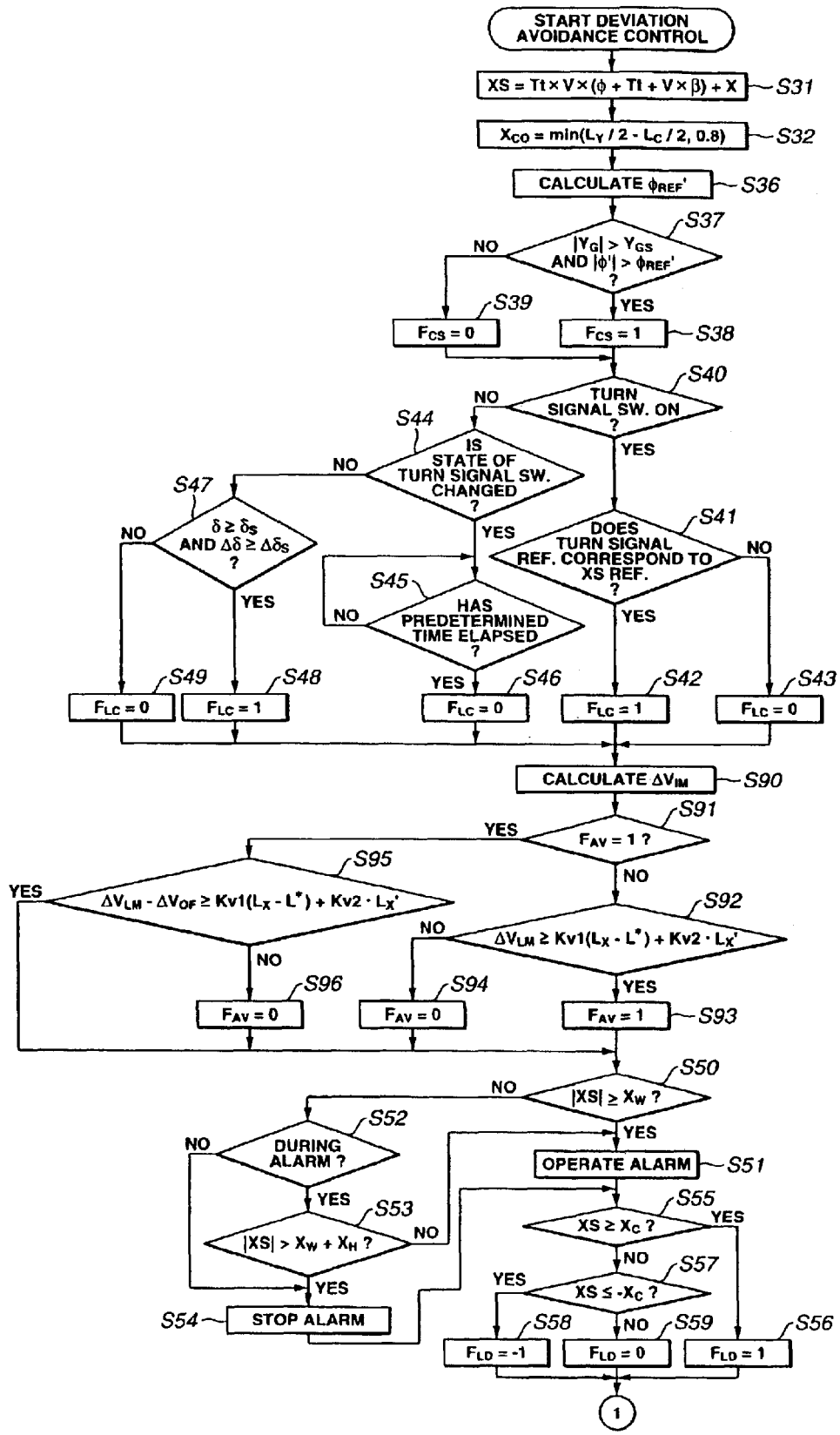
FIG. 8 is a flowchart showing a front part of the deviation avoidance control processing of the lane-keep control system according to a second embodiment of the present invention.
Figure 9:
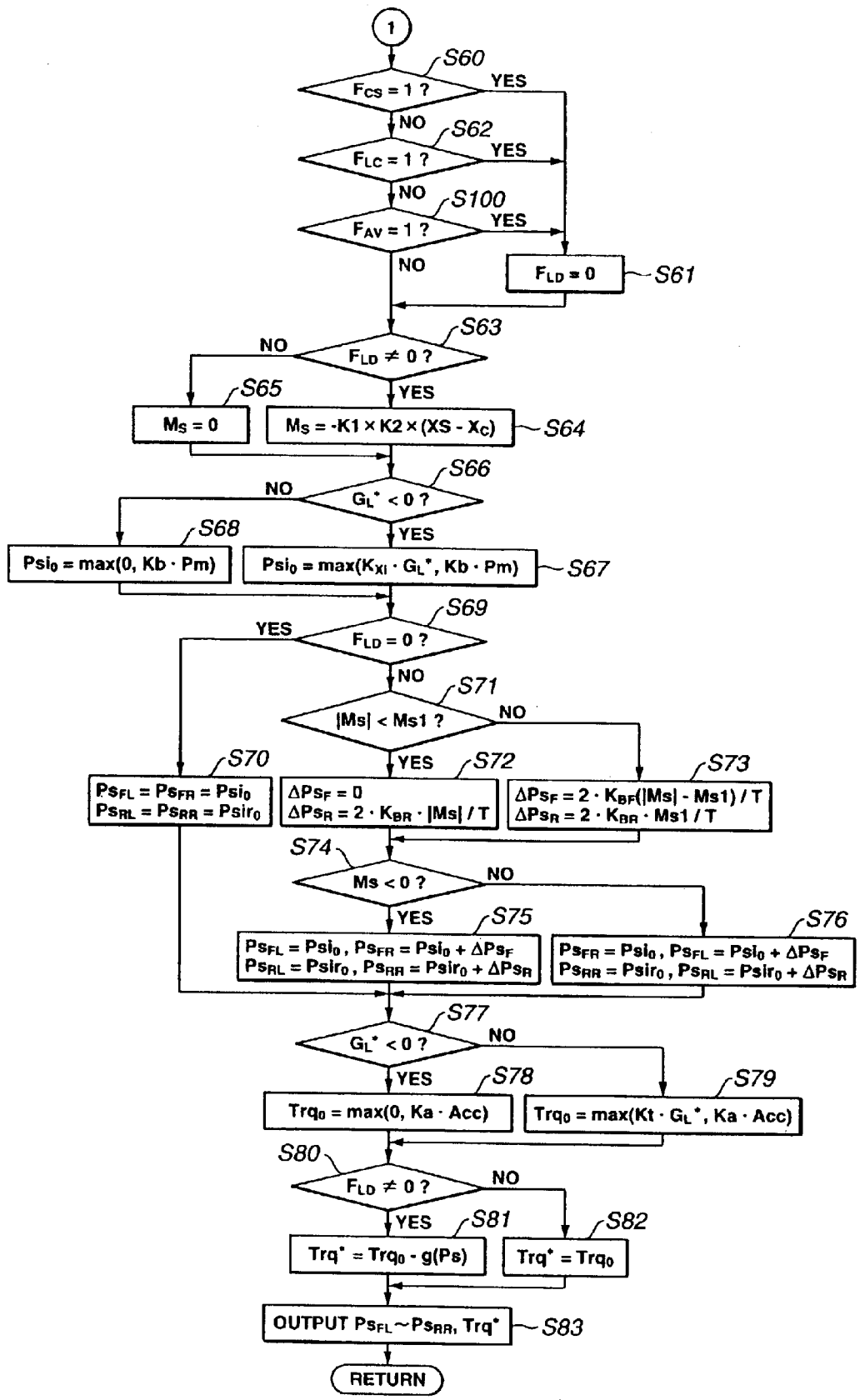
FIG. 9 is a flowchart showing a rear part of the deviation avoidance control processing of the lane-keep control system according to the second embodiment of the present invention.
Figure 10:
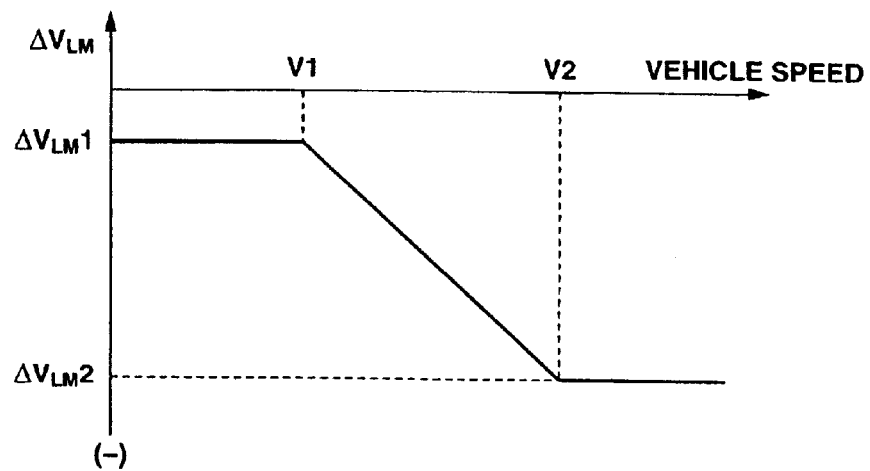
FIG. 10 is a control map employed in the processing of FIG. 8.

Next, referring to FIGS. 8 through 10, there is shown a second embodiment of the lane-keep control system according to the present invention.

The second embodiment is arranged such that when the inter-vehicle distance control is being executed, the operation of the deviation avoidance control is restricted according to an inter-vehicle distance between the host vehicle and a preceding vehicle ahead of the host vehicle. More specifically, as is clearly shown in FIGS. 8 and 9 representing the deviation avoidance control processing at step S14 in FIG. 2, steps S32 through S35 are omitted as compared with the flowchart of FIGS. 4 and 5, steps S90 through S96 are provided subsequent to steps S42, S43, S46, S48 and S49 and before step S90. Further, subsequent to step S62 in FIG. 2, there is provided step S100 for determining whether or not an avoidance possibility determination flag $F_{AV}$ is set at 1 or not. When the determination at step S100 is affirmative ($F_{AV}$=1), the routine proceeds to step S61. When the determination at step S100 is negative, the routine proceeds to step S63.

The other steps in FIGS. 8 and 9 are the same as the steps in FIGS. 4 and 5, and are denoted by same reference numerals. Therefore, the explanation of the other steps in FIGS. 8 and 9 are omitted herein.

Subsequently, the deviation avoidance possibility determination processing will be discussed with reference to steps S90 through S96 in FIG. 8.

At step S90 subsequent to the execution of one of steps S42, S43, S46, S48 and S49, control unit 8 calculates an avoidance possibility determination threshold $\Delta V_{LM}$ on the basis of vehicle speed V with reference to an avoidance-possibility determination threshold calculation map shown in FIG. 10. The avoidance-possibility determination threshold calculation map represents a relationship between threshold $\Delta V_{LM}$ and vehicle speed V such that threshold $\Delta V_{LM}$ takes a negative value $\Delta V_{LM}1$ which is relatively small in absolute value when vehicle speed V is smaller than a relatively low speed V1, that threshold $\Delta V_{LM}$ increases toward the negative direction of a negative value $\Delta V_{LM}2$ which is relative large in absolute value as vehicle speed V increases to a relatively large speed V2, and that threshold $\Delta V_{LM}$ takes negative value $\Delta V_{LM}2$ when vehicle speed V is higher than relatively large speed V2.

At step S91 subsequent to the execution of step S90, control unit 8 determines whether or not a deviation-avoidance-possibility determination flag $F_{AV}$ is set at 1. When the determination at step S91 is negative ($F_{AV}$=0), the routine proceeds to step S92. When the determination at step s91 is affirmative ($F_{AV}$=1), the routine proceeds to step S95.

At step S92, control unit 8 determines whether or not the following expression (28) is satisfied, on the basis of inter-vehicle distance $L_X$, target inter-vehicle distance $L_X^*$ and relative speed $L_X'$.

$$\Delta V_{LM} \geq Kv1(L_X - L_X^*) + Kv2 \cdot L_X' \qquad (28)$$

When the determination at step S92 is affirmative, that is, when the expression (28) is satisfied, control unit 8 determines that there is a high possibility that the driver executes the steering operation by controlling steering wheel 19a. Therefore, the routine proceeds to step S93 wherein control unit 8 sets deviation-avoidance possibility determination flag $F_{AV}$ at 1. A condition $F_{AV}$=1 represents the high possibility that the driver executes the deviation avoidance by controlling steering wheel 19a. Then, the routine proceeds from step S93 to step S50. When the determination at step S92 is negative, the routine proceeds to step S94 wherein control unit 8 resets deviation-avoidance-possibility determination flag $F_{AV}$ ($F_{AV}$=0).

At step S95 subsequent to the affirmative determination ($F_{AV}$=1) at step S91, control unit 8 determines whether or not the following expression (29) is satisfied, on the basis of inter-vehicle distance $L_X$, target inter-vehicle distance $L_X^*$ and relative speed $L_X'$.

$$\Delta V_{LM} - \Delta V_{OF} \geq Kv1(L_X - L_X^*) + Kv2 \cdot L_X' \qquad (29)$$

where $\Delta V_{OF}$ is an offset value for preventing hunting.

When the determination at step S95 is affirmative, control unit 8 determines that there is the high possibility of the avoidance operation, and the routine proceeds to step S50. When the determination at step S95 is negative, control unit 8 determines that there is a low possibility of the avoidance operation for the reason that there is a margin as to the inter-vehicle distance or that a relative speed between the host vehicle and the vehicle ahead of the host vehicle is small. Therefore, when the negative determination is made at step S95, the routine proceeds to step S96 wherein avoidance possibility determination flag $F_{AV}$ is reset ($F_{AV}$=0). Thereafter, the routine proceeds to step S50.

In the processing in FIGS. 8 and 9, the processing of steps S31 through S61 corresponds to deviation determination means. The processing of steps S90 through S96 corresponds to deviation avoidance limiting means. The processing of steps S63 through S82 corresponds to deviation avoidance control means. The processing of steps S63 through S65 corresponds to target yawing moment calculating means. The processing of steps S66 though S82 corresponds to braking/driving controlled variable calculating means. The processing of step S83, brake hydraulic control circuit 7 and driving torque control unit 12 correspond to pressure distribution control means. The target yawing moment calculating means, the driving/braking controlled variable calculating means and the pressure distribution control means construct driving/braking force control means.

With the thus second embodiment according to the present invention, when the following four conditions are satisfied:

A first condition that hen the inter-vehicle distance control is put in operative state in reply to the turn-on of inter-vehicle distance control starting switch 25 by the driver;

A second condition that the deviation avoidance control is put in operative state;

A third condition that deviation-avoidance possibility determination flag $F_{AV}$ is reset ($F_{AV}$=0);

A fourth condition that the inter-vehicle distance control is properly executed so that actual inter-vehicle distance $L_X$ is almost equal to target inter-vehicle distance $L_X^*$ and that relative speed $L_X'$ is almost equal to zero; threshold $\Delta V_{LM}$ calculated at step S90 takes a negative value regardless of vehicle speed V as shown in FIG. 10, and there is low possibility that the deviation avoidance operation is executed by the driver's steering intervention.

Therefore, the value of the right side in the expression (28) takes almost zero, and a relationship $\Delta V_{LM}$<0 is established. That is, the expression (28) is not satisfied, and the routine proceeds to step S94 wherein deviation-avoidance possibility determination flag $F_{AV}$ is reset ($F_{AV}$=0).

Under this situation, the routine in FIG. 9 never proceeds from step S100 to step S61, and therefore the deviation avoidance control is executed according to the state of deviation determination flag $F_{LD}$. Further, when it is determined that there is a lane-deviation possibility as a result that deviation estimate XS becomes greater than or equal to lateral displacement limit value $X_C$, the yawing moment for avoiding the host vehicle from deviating the traveling lane is generated, and the deviation of the host vehicle from the traveling lane is prevented. Therefore, the host vehicle can continue traveling within a traveling lane.

However, when inter-vehicle distance $L_X$ is radically decreases or when relative speed $L_X'$ of a negative value radically increases so that the host vehicle excessively approaches a preceding vehicle or a cut-in vehicle as a result that the preceding vehicle suddenly brakes with a large deceleration greater than a generative deceleration of the host vehicle during the inter-vehicle distance control or that a vehicle in an adjacent lane cuts in a space between the preceding vehicle and the host vehicle, the right side in the expression (28) takes a negative value. Accordingly, the value becomes smaller than or equal to threshold $\Delta V_{LM}$, and the expression (28) is satisfied. Consequently under this condition, the routine proceeds to step S93 wherein deviation-avoidance possibility determination flag $F_{AV}$ is set at 1 ($F_{AV}=1$).

That is, even when both of vehicle unstable flag FCS and lane change flag FLC have been reset, the routine in FIG. 9 can proceed from step S100 to step S61 wherein deviation determination flag $F_{LD}$ is reset. Accordingly, this flag setting stops the deviation avoidance control. This arrangement enables the driver to smoothly execute the steering operation for preventing the lane deviation of the host vehicle in a case that the driver steers steering wheel 19a in the leftward or rightward without operating the turn-direction indicator in order to avoid a sudden approach of the host vehicle to the preceding vehicle.

If deviation-avoidance possibility determination flag $F_{AV}$ is set at 1 ($F_{AV}=1$), the next processing in FIG. 8 proceeds from step S91 to step S95. Accordingly, until the negative determination is made at step S95, that is, until the value ($Kv1(L_X-L_X^*)+Kv2 \cdot L_X'$) becomes the subtract ($\Delta V_{LM}-\Delta V_{OF}$), deviation-avoidance possibility determination flag $F_{AV}$ has been reset ($F_{AV}=0$). When the negative determination is made at step S95, deviation-avoidance possibility determination flag $F_{AV}$ is set at 1 ($F_{AV}=1$). That is, the avoidance possibility determination flag $F_{AV}$ is maintained at 1 even if the value ($Kv1(L_X-L_X^*)+Kv2 \cdot L_X'$) becomes slightly smaller than the threshold after avoidance possibility determination flag $F_{AV}$ is set at 1. This arrangement certainly prevents hunting.

Thereafter, when the negative determination is made at step S95, that is, when the expression (29) is not satisfied, deviation-avoidance possibility flag $F_{AV}$ is reset ($F_{AV}=0$), and therefore step S61 is not executed, that is, deviation determination flag is not forcibly reset. Accordingly, the deviation avoidance control is restarted.

Further, target inter-vehicle distance $L_X^*$ for the inter-vehicle distance control becomes loner as vehicle speed V becomes higher. Accordingly, the possibility that the driver executes a steering operation for avoiding the lane deviation is decreases as vehicle speed V becomes higher. Since threshold $\Delta V_{LM}$ is arranged so that an absolute value of a negative value of threshold $\Delta V_{LM}$ increases according to the increase of vehicle speed V as shown in FIG. 10, the possibility for satisfying the expression (28) decreases the degree of limiting the deviation avoidance control.

Although the second embodiment has been shown and described such that control unit 8 determines whether the possibility of the driver's steering intervention for avoiding the lane deviation is high or not, on the basis of inter-vehicle distance $L_X$, target inter-vehicle distance $L_X^*$ and relative speed $L_X'$, the invention is not limited to this and may be arranged such that the possibility may be determined on the basis of only relative speed $L_X'$.

Subsequently, referring to FIGS. 11 and 12, a third embodiment according to the present invention will be discussed. The third embodiment is arranged such that the lane-keep control is executed by the steering control of a steering system instead of the brake hydraulic pressure control.

Figure 11:
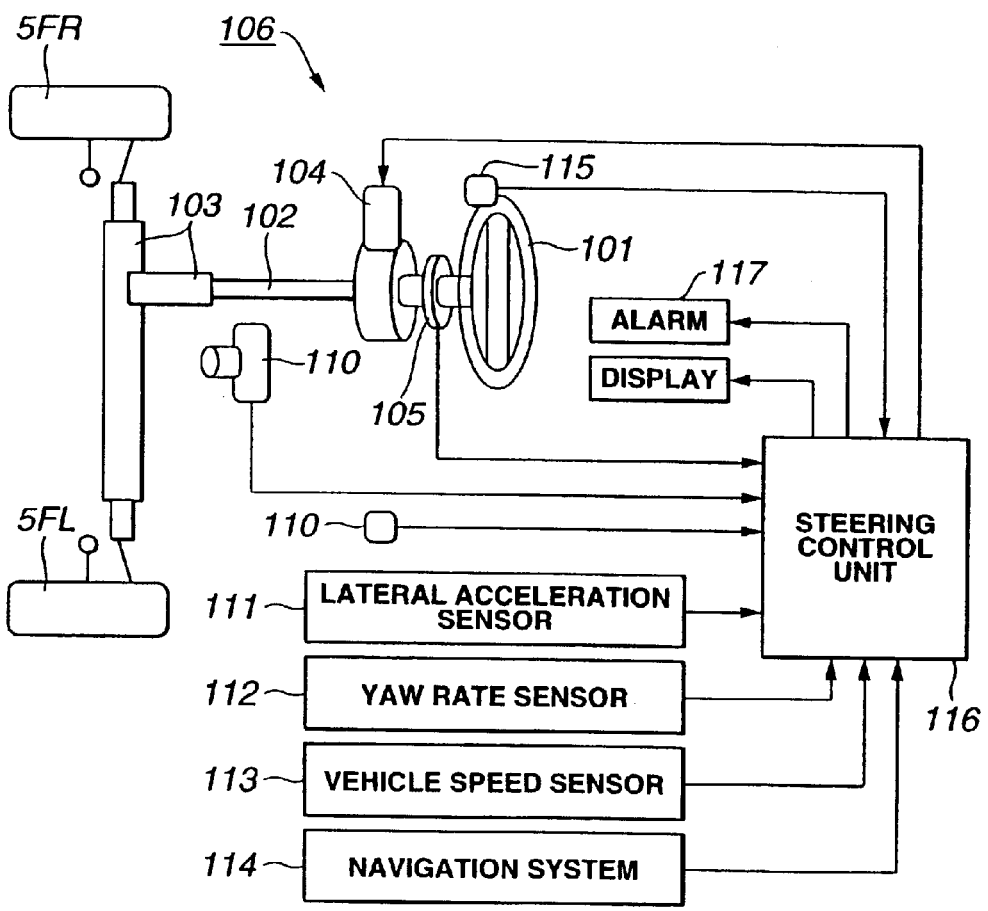
FIG. 11 is a schematic view showing a vehicle equipped with the lane-keep control system according to a third embodiment of the present invention.

More specifically, as shown in FIG. 11, the control system comprises a steering system 106 which has a steering wheel 101, a steering shaft 102, steering gear set 103, a steering actuator 104 and a steer angle sensor 105. Steering wheel 101 is interconnected with front-left wheel 5FL and front-right wheel 5FR through steering shaft 102 and steering gear set 103. Steering actuator 104 for generating a steering assist force is attached to steering shaft 102. Steer angle sensor 105 installed in steering system 101 to detect a steer angle of the host vehicle. Steering actuator 104 is controlled by a steering control unit 116 to which detection signals of a camera device 110 for taking an image view ahead of the host vehicle, a lateral acceleration sensor 111, a yaw rate sensor 112, and a vehicle speed sensor 113. Further, an alarm device 117 is connected to steering control unit 116.

Steering control unit 116 executes the lane-keep control processing shown in FIG. 19 so as to execute the lane-keep control by controlling steering system 106 when the host vehicle is put in the lane-deviation condition. That is, in this third embodiment, steering control unit 116 mainly executes various programs instead of control unit 8 employed in the first and second embodiment.

Figure 12:
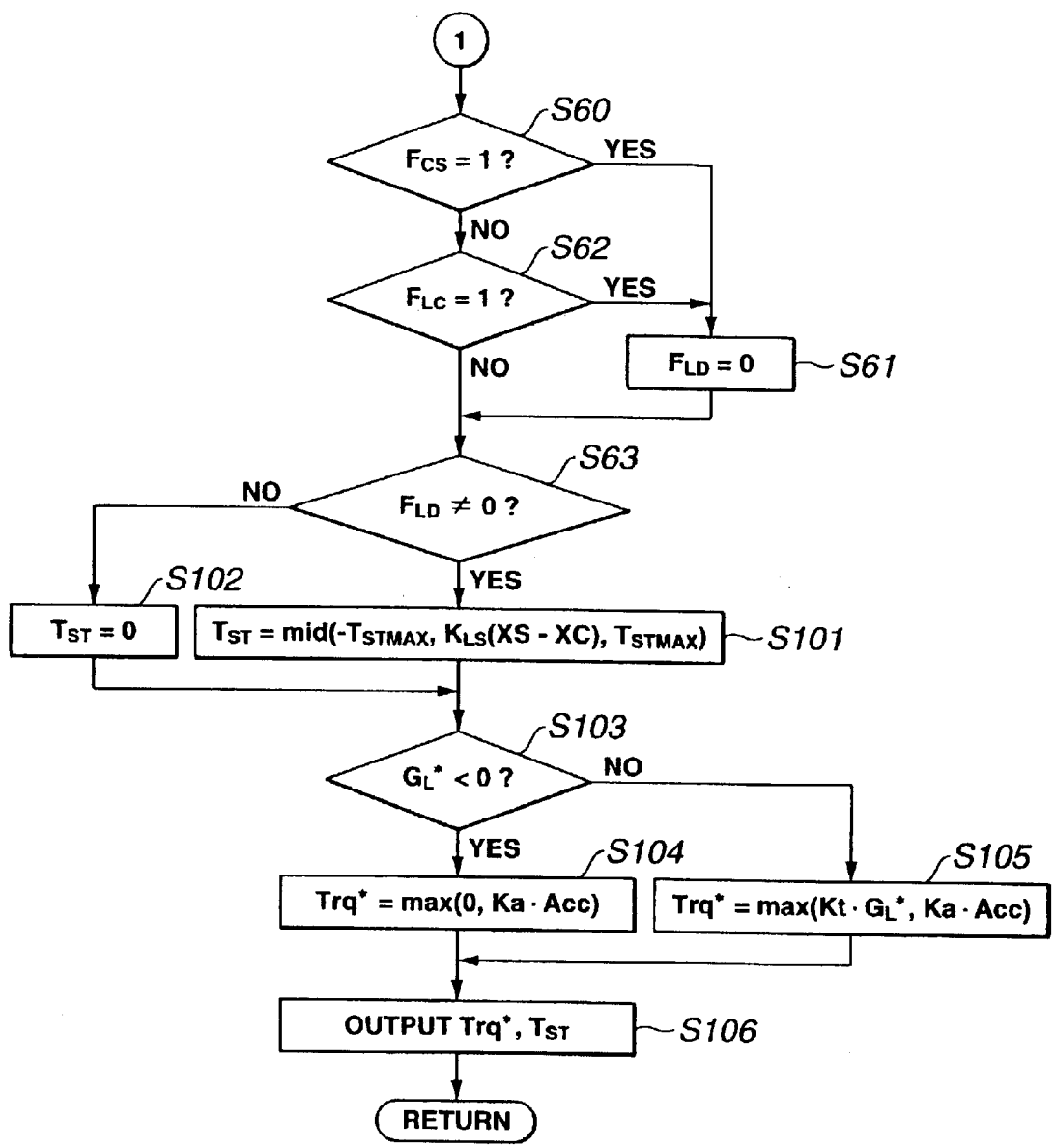
FIG. 12 is a flowchart showing a rear part of the deviation avoidance control processing of the lane-keep control system according to the third embodiment.

As shown in FIG. 12, the lane-keep control processing of the third embodiment according to the present invention is arranged to omit the processing of steps S64 through S83 in FIG. 5, and to add the following processing. That is, when the determination at step S63 is affirmative ($F_{LD} \neq 0$), the routine proceeds to step S101 wherein steering control unit 116 calculates target additional steering torque $T_{ST}$ using the following expression (30). Thereafter, the routine proceeds to step S103.

$$T_{ST}=\text{mid}(-T_{STMAX}, -K_{LS}(XS-Xc), T_{STMAX}) \tag{30}$$

where $T_{STMAX}$ is a limit value of the additional steering torque, $K_{LS}$ is a constant determined from vehicle specifications, and mid(a, b, c) is a function for selecting an intermediate value from a, b and c surrounded by brackets.

When the determination at step S63 is negative ($F_{LD}=0$), the routine proceeds to step S102 wherein steering control unit 116 sets target additional torque $T_{ST}$ at 0 ($T_{ST}=0$). Thereafter, the routine proceeds to step S103.

At step S103, steering control unit 116 determines whether or not target acceleration $G_L^*$ obtained in the inter-vehicle distance control processing is a negative value. When the determination at step S103 is affirmative ($G_L^*<0$), the routine proceeds to step S104 wherein control unit 116 calculates a target driving torque Trq* using the following expression (31). Then, the routine proceeds to step S106.

$$Trq=\max(0, Ka \cdot Acc) \tag{31}$$

When the determination at step S103 is negative ($G_L^* \geq 0$), the routine proceeds to step S105 wherein control unit 116 calculates target driving torque Trq* using the following expression (32). Then, the routine proceeds to step S106.

$$Trg^*=\max(Kt \cdot G_L^*, Ka \cdot Acc) \tag{32}$$

At step S106, steering control unit 116 outputs a drive signal according to target additional steering torque $T_{ST}$ to control steering actuator 104 of steering system 106, and outputs ((target driving torque Trq* to driving torque controlled 12)). Then, the present timer interruption routine is terminated to return the main routine.

In the processing shown in FIG. 12, the processing of steps S63, S101 and S103 corresponds to the deviation avoidance control means.

With the thus arranged third embodiment, as is similar to the first embodiment, when the inter-vehicle distance control processing starts as a result that distance control flag $F_{AC}$ is set at 1 ($F_{AC}$=1), the routine in FIG. 4 proceeds to step S35 wherein lateral displacement limit value $X_C$ is set at a value obtained by subtracting a multiple of predetermined value $\Delta X_C$ and selected target inter-vehicle distance $L_{Xj}{}^*$ from initial value $X_{C0}$ of the lateral displacement limit value. Therefore, the start timing of the lane is set early.

Under this condition, when deviation determination flag $F_{LD}$ is set at 0 ($F_{LD}$=0), the routine proceeds from step S63 to step S102 wherein target additional steering torque $T_{ST}$ is set at zero $T_{ST}$=0). Therefore, steering control unit 116 outputs a signal indicative of zero torque generating command to steering actuator 104 of steering device 106 to stop the deviation avoidance control.

However, when the inter-vehicle distance control processing is being executed and when deviation estimate XS becomes greater than or equal to lateral displacement limit value $X_C$ ($X_C$=$X_{C0}$−$\Delta X_C \cdot L_{Xj}{}^*$), deviation determination flag $F_{LD}$ is set at 1 ($F_{LD}$=1) at step S56 in FIG. 4. Thereafter, the routine proceeds from step S63 to step S101 wherein steering control unit 116 calculates steering additional torque $T_{ST}$ directed in the rightward. Steering actuator 104 of steering device 106 generates steering additional torque TST according to the command signal from steering control unit 116. Accordingly the steering operation in the direction opposite to the deviating direction is executed, and the host vehicle returned within the traveling lane earlier than a case that the inter-vehicle distance control is not executed.

Although the third embodiment according to the present invention has been shown and described such that the deviation avoidance control corresponding to the control in the first embodiment is executed, the invention is not limited to this and may be arranged such that the deviation avoidance control corresponding to the control in the second embodiment may be executed in the construction disclosed in the third embodiment.

While the first, second and third embodiments according to the present invention have been shown and described such that the stable condition of the host vehicle is determined by determining whether absolute value $|Y_G|$ of lateral acceleration $Y_G$ is greater than preset value $Y_{GS}$ and whether absolute value $|\phi'|$ of yaw rate is greater than target yaw rate $\phi_{REF}{}'$, the invention may not be limited to this, and the stable condition of the host vehicle may be determined only by determining whether absolute value $|Y_G|$ of lateral acceleration $Y_G$ is greater than preset value $Y_{GS}$.

Furthermore, although the first through third embodiments have been shown and described such that lateral displacement limit value $X_C$ is calculated using the expression (5), it will be understood that the invention is not limited to this, and the lateral displacement limit value $X_C$ may be varied according to the road condition which is obtained by calculating lane-width L through processing an image detected by CCD camera 13 or by reading information as to a lane width from the information of map data and a present position of the host vehicle obtained from a navigation system.

This application is based on Japanese Patent Applications No. 2001-395209 filed on Dec. 26, 2001 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A lane-keep control system for a host vehicle, comprising:
    a control unit configured, to detect an inter-vehicle distance between the host vehicle and an object ahead of the host vehicle,
    to execute an inter-vehicle distance control for bringing the inter-vehicle distance closer to a target inter-vehicle distance according to a driver's demand,
    to detect a traveling condition of the host vehicle,
    to determine whether there is a tendency of a lane deviation indicative that the host vehicle is deviating from a traveling lane, according to the traveling condition,
    to execute a deviation avoidance control for controlling the host vehicle toward a deviation-avoiding direction of avoiding the lane deviation according to the traveling condition when there is the tendency of the lane deviation,
    to determine that the inter-vehicle distance control is being executed,
    to advance a start timing of the deviation avoidance control when the inter-vehicle distance control is being executed.

2. The lane-keep control system as claimed in claim 1, wherein the control unit is configured to decrease a threshold to be compared with the vehicle traveling condition for determining the tendency of the lane deviation when the inter-vehicle distance control is being executed, so that the deviation avoidance control start timing is advanced during execution of the inter-vehicle distance control when compared to the start timing of the deviation avoidance control when the inter-vehicle distance control is not being executed.

3. The lane-keep control system as claimed in claim 1, wherein the control unit is configured to change a first start timing, at which the deviation avoidance control during execution of the inter-vehicle distance control is started, to a timing earlier than a second start timing, at which the deviation avoidance control is started when the inter-vehicle distance control is not being executed, the first and second start timings being determined on the basis of the determination as to the tendency of the lane deviation.

4. The lane-keep control system as claimed in claim 3, further comprising a target distance selecting device for manually selecting one of target inter-vehicle distance set values, the control unit being further configured to set the first start timing according to the selected one of the target inter-vehicle distance set values.

5. The lane-keep control system as claimed in claim 1, further comprising a driving/braking force control system which is commanded by the control unit to vary driving/braking force of each wheel for the deviation avoidance control, the control unit being configured to calculate a driving/braking force controlled variable of each of right and left wheels of the host vehicle so that the host vehicle generates a yawing moment for avoiding the lane deviation according to the traveling condition of the host vehicle when there is the tendency that the host vehicle deviates from the traveling lane and to adjust a distribution of the driving/braking force to each wheel according to the driving/braking force through the driving/braking force control system.

6. The lane-keep control system as claimed in claim 1, further comprising a deviation avoidance control starting switch through which the deviation avoidance control is manually started and an inter-vehicle distance control starting switch through which the inter-vehicle distance control is manually started, the deviation avoidance control starting switch being automatically turned on when the inter-vehicle distance control switch is turned on.

7. The lane-keep control system as claimed in claim 1, wherein the control unit is configured to estimate a future lateral displacement of the host vehicle relative to a center of a traveling lane on the basis of at least a vehicle speed, a vehicle yaw rate relative to the traveling lane, a lateral displacement, and a curvature of the traveling lane ahead of the host vehicle, the control unit being further configured to determine that the host vehicle is in a lane deviation condition when the lateral displacement estimated value is greater than or equal to a lateral displacement limit value.

8. The lane-keep control system as claimed in claim 1, wherein the control unit is configured to estimate a future lateral displacement of the host vehicle relative to a center of a traveling lane on the basis of at least a vehicle speed, a vehicle yaw rate relative to the traveling lane, a lateral displacement, and a curvature of the traveling lane ahead of the host vehicle, to calculate a target yawing moment to be generated by the host vehicle according to a difference between the estimated future lateral displacement and a lateral displacement limit value, and to control a driving/braking force to be generated at right and left wheels according to the target yawing moment.

9. The lane-keep control system as claimed in claim 8, wherein the control unit is capable of controlling a braking force of each wheel regardless of a steering operation by a driver of the host vehicle.

10. The lane-keep control system as claimed in claim 1, wherein the control unit is further configured to output a steering torque command to a steering device of the host vehicle so as to generate a steering torque directed in a deviation avoiding direction when there is the tendency that the host vehicle deviates from the traveling lane.

11. The lane-keep control system as claimed in claim 1, further comprising an inter-vehicle distance detector which detects the inter-vehicle distance and outputs a signal indicative of the inter-vehicle distance to the control unit, and a traveling condition detector which detects the traveling condition and outputs a signal indicative of the traveling condition to the control unit.

12. A lane-keep control system for a host vehicle, comprising:
a control unit configured,
to detect an inter-vehicle distance between the host vehicle and an object ahead of the host vehicle,
to execute an inter-vehicle distance control for bringing the inter-vehicle distance closer to a target inter-vehicle distance,
to detect a traveling condition of the host vehicle,
to determine whether there is a tendency of a lane deviation indicative that the host vehicle is deviating from a traveling lane, according to the traveling condition,
to execute a deviation avoidance control for controlling the host vehicle toward a deviation-avoiding direction of avoiding the lane deviation according to the traveling condition when there is the tendency of the lane deviation,
to limit execution of the deviation avoidance control according to a determination value corresponding to the inter-vehicle distance detected.

13. The lane-keep control system as claimed in claim 12, further comprising a target distance selecting device for manually selecting one of target inter-vehicle distance set values, the determination value being changed according to the selected one of the target inter-vehicle distance set values.

14. A method of controlling a traveling condition of a host vehicle, the method comprising:
detecting an inter-vehicle distance between the host vehicle and an object ahead of the host vehicle;
executing an inter-vehicle distance control for bringing the inter-vehicle distance closer to a target inter-vehicle distance;
detecting a traveling condition of the host vehicle;
determining whether there is a tendency of a lane deviation indicative that the host vehicle is deviating from a traveling lane, according to the traveling condition;
executing a deviation avoidance control for controlling the host vehicle toward a deviation-avoiding direction of avoiding the lane deviation according to the traveling condition when there is the tendency of the lane deviation;
determining that the inter-vehicle distance control is being executed; and
advancing a start of the deviation avoidance control when the inter-vehicle distance control is being executed.

15. A lane-keep control system for a host vehicle, comprising:
inter-vehicle distance detecting means for detecting an inter-vehicle distance between the host vehicle and an object ahead of the host vehicle;
inter-vehicle distance control means for executing an inter-vehicle distance control so as to bringing the inter-vehicle distance closer to a target inter-vehicle distance;
traveling-condition detecting means for detecting a traveling condition of the host vehicle;
lane-deviation determining means for determining whether there is a tendency of a lane deviation that the host vehicle is deviating from a traveling lane according to the traveling condition;
deviation-avoidance control means for executing a deviation avoidance control of controlling the host vehicle toward a deviation-avoiding direction of avoiding the lane deviation according to the traveling condition when there is the tendency of the lane deviation;
distance control operation detecting means for detecting that the inter-vehicle distance control means is in operative state; and
control start-timing changing means for changing a first start timing, at which the deviation avoidance control during execution of the inter-vehicle distance control is started, to a timing earlier than a second start timing at which the deviation avoidance control is started under a condition that the inter-vehicle distance control is not executed, the first and second start timings being determined on the basis of a determination result of the lane-deviation determining means.

* * * * *